(12) United States Patent
Ohara

(10) Patent No.: US 9,817,811 B2
(45) Date of Patent: Nov. 14, 2017

(54) WEB SERVER SYSTEM, DICTIONARY SYSTEM, DICTIONARY CALL METHOD, SCREEN CONTROL DISPLAY METHOD, AND DEMONSTRATION APPLICATION GENERATION METHOD

(71) Applicant: Nomura Research Institute, Ltd., Tokyo (JP)

(72) Inventor: Soichi Ohara, Tokyo (JP)

(73) Assignee: NOMURA RESEARCH INSTITUTE, LTD., Tokyo (JP)

( * ) Notice: Subject to any disclaimer, the term of this patent is extended or adjusted under 35 U.S.C. 154(b) by 269 days.

(21) Appl. No.: 14/426,470

(22) PCT Filed: Aug. 29, 2013

(86) PCT No.: PCT/JP2013/073185
§ 371 (c)(1),
(2) Date: May 20, 2015

(87) PCT Pub. No.: WO2014/045826
PCT Pub. Date: Mar. 27, 2014

(65) Prior Publication Data
US 2015/0278190 A1    Oct. 1, 2015

(30) Foreign Application Priority Data

Sep. 18, 2012  (JP) ................................ 2012-204075
Sep. 18, 2012  (JP) ................................ 2012-204076
Sep. 18, 2012  (JP) ................................ 2012-204077

(51) Int. Cl.
G06F 17/21    (2006.01)
G06F 17/27    (2006.01)
H04L 29/08    (2006.01)

(52) U.S. Cl.
CPC .......... *G06F 17/2735* (2013.01); *H04L 67/10* (2013.01)

(58) Field of Classification Search
CPC ...... G06F 17/245; G06F 17/246; G06F 17/24; G06F 17/30315; G06F 17/30554; G06F 17/30389
(Continued)

(56) References Cited

U.S. PATENT DOCUMENTS 5,497,319  A  *  3/1996  Chong ................. G06F 17/2264
                                                                704/10
2002/0173295  A1    11/2002  Nykanen et al.
(Continued)

FOREIGN PATENT DOCUMENTS

JP    2003044474 A    2/2003
JP    2004535000 A    11/2004
(Continued)

OTHER PUBLICATIONS

The International Search Report from corresponding International Application No. PCT/JP2013/073185 dated Nov. 26, 2013.
(Continued)

*Primary Examiner* — Scott Baderman
*Assistant Examiner* — Hassan Mrabi
(74) *Attorney, Agent, or Firm* — McCormick, Paudling & Huber LLP

(57) ABSTRACT

Provided is a Web server system capable of dynamically changing a display format of a single item displayed on a screen into the contents which are different in different levels such as in respective Web sites or respective screens. According to a typical embodiment, a dictionary system for providing dictionary data to a Web server system has: a plurality of types of dictionary tables having a hierarchical structure, the dictionary table having a large applicable
(Continued)

range serving as a higher level regarding a range to which the dictionary data is applied; and a dictionary processing unit for acquiring the dictionary data corresponding to a specified key from the specified dictionary table. When the dictionary data is to be acquired from the dictionary table, the dictionary processing unit receives specification that the dictionary table of which hierarchy is to be referenced and, if the dictionary data corresponding to the specified key is not present in the dictionary table of the specified hierarchy, sequentially inquires the dictionary table of a further higher level whether the dictionary table has the dictionary data corresponding to the key or not.

16 Claims, 12 Drawing Sheets

(58) Field of Classification Search
USPC .......................................................... 715/249
See application file for complete search history.

(56) References Cited

U.S. PATENT DOCUMENTS

| 2002/0174150 | A1 | 11/2002 | Dang et al. | |
| 2005/0154690 | A1* | 7/2005 | Nitta | G06F 17/3061 706/46 |
| 2005/0154742 | A1* | 7/2005 | Roth | G06F 8/00 |
| 2005/0165829 | A1* | 7/2005 | Varasano | G06F 17/211 |
| 2006/0066905 | A1 | 3/2006 | Takashima et al. | |
| 2008/0133699 | A1* | 6/2008 | Craw | H04L 67/10 709/217 |
| 2013/0191733 | A1* | 7/2013 | Jang | G06F 17/212 715/249 |
| 2013/0249832 | A1* | 9/2013 | Nakamura | G06F 17/276 345/173 |
| 2014/0123297 | A1* | 5/2014 | Ahn | G06F 21/10 726/26 |

FOREIGN PATENT DOCUMENTS

| JP | 2006065677 A | 3/2006 |
| JP | 2009176124 A | 8/2009 |
| JP | 2012008805 A | 1/2012 |

OTHER PUBLICATIONS

The Internet <URL: http://rubyonrails.org/>.

".NET Framework 4 File System Web Site Project." <URL:http://msdn.microsoft.com/ja-jp/Library/e5x4xz73> Nov. 2007, and its English Translation (3 Pages).

* cited by examiner

FIG. 8A

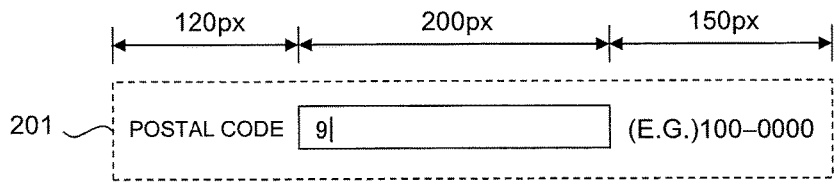

FIG. 8B

```
<div class ="komoku">
    <div class="itmTlcell" style=" width : 120px;">POSTAL CODE</div>
    <div class="cell">
        <input type="text" jsfc="h:inputText" name="postal_cd"
            value="#{personalDto.p.postal_cd}" style=" width : 200px;"/>
    </div>
    <div class="cmt"    style=" width : 150px;" >(E.G.)100-0001</div>
</div>
```
101

FIG. 8C

```
$viewObject->echoEditCtl('','fmt:pc','120:200:150');
$viewObject->echoEditCtl($vi->data['postal_cd'],'_bi','txt','postal_cd','*');
```

LAYOUT INFORMATION IS INDEPENDENT

PARTS OBJECT IS DISPLAYED BY UTILIZING DICTIONARY TABLE

101

WEB SERVER SYSTEM, DICTIONARY SYSTEM, DICTIONARY CALL METHOD, SCREEN CONTROL DISPLAY METHOD, AND DEMONSTRATION APPLICATION GENERATION METHOD

CROSS REFERENCE TO RELATED APPLICATIONS

This application is entitled to the benefit of and incorporates by reference subject matter disclosed in International Patent Application No. PCT/JP2013/073185 filed Aug. 29, 2013, and Japanese Application Nos. 2012-204075 filed on Sep. 18, 2012; 2012-204076 filed on Sep. 18, 2012; and 2012-204077 filed on Sep. 18, 2012, the contents of all are incorporated by reference into this application.

TECHNICAL FIELD

The present invention relates to techniques effective when applied to development techniques of applications in a Web server system.

BACKGROUND ART

In the background of development of IT techniques, globalization of businesses, etc., the necessity of supporting a plurality of languages by Web sites and Web applications has been increasing. As a method that enables access to a Web site or a Web application by a plurality of language environments, for example, as a conventionally used method, there is a method in which individual contents of translation of identical contents by languages are prepared in advance, and these are automatically or manually selected and used depending on the language environment, etc. used by users. Other than this, various techniques have been proposed as the techniques for supporting multiple languages in an application program.

For example, Japanese Patent Application Laid-Open No. 2003-44474 describes techniques that provide dynamic language translation of a content part by defining a language based on client and user information, defining a skeleton of the content part including a content element, translating skeleton content elements to the language defined based on the client and user information by utilizing a translation table in which the skeleton content elements are saved or by utilizing dynamic natural language translation of the skeleton contents, and integrating the translated skeleton content elements with the content part.

Herein, it is also carried out to dynamically change display contents and translation contents by implementing data like the above described translation table, which retains the translation contents of each of language environments for the content elements, for example, as a dictionary making up files, a database, etc. and updating the data of the dictionary.

In an application program operated in a Web server system, particularly, for example, in a CRUD (Create, Read, Update, Delete) type Web application program which accesses a business database, a user interface has to be built by orderly disposing screen controls (hereinafter, simply described as "controls" in some cases) displaying the contents about many input/output items (for example, input items for specifying the contents of search conditions for acquiring data from the business database, output items displaying the contents of search results) on a screen so as to facilitate viewing and operating by a user.

Particularly, recently, single business logic is required to support the user interfaces of various devices such as portable terminals other than PCs (Personal Computers), and separation between logical elements about the input/output items and layout information has become important.

In development of a Web application program, in order to, for example, reduce or standardize the development load including such interface part, an application framework, etc. such as a so-called integrated development environment (IDE: Integrated Development Environment) including a GUI (Graphical User Interface) creating function and Ruby on Rails (RoR) are used in some cases. These are also used in combination. By using such development supporting tools, etc., for example, development load can be reduced or standardized by automatically generating source code for a Web application program having a user interface.

Regarding the point of display controlling of screen controls, for example, Japanese Patent Application Laid-Open No. 2012-8805 describes an information processing device configured to enable manipulation of a user interface such as Web contents with good visibility even with a touch panel, the information processing device provided with a control means which can control a touch panel, a user-interface analyzing means which analyzes displayed resources, and a first user-interface changing means which changes rewriting of resources. Herein, the control means distinguishes the part which cannot be easily touched in the user interface analyzed by the user-interface analyzing means, and the user interface is changed to a user interface which can be easily touched by using the first user-interface changing means.

The systems and services by the Web application program as described above are executed mainly when a user accesses an application program working on a Web server by utilizing a Web browser, etc. working on a client terminal. A user interface is provided to the user via the Web browser.

In some cases, a demo application program, prototype, etc. (hereinafter, these are collectively described as "demo application" in some cases) for explaining the functions, operations, screen layout, processing procedure, etc. of the systems and services and checking the contents thereof for other clients, system users, etc. by simply reproducing the user interface (contents of screens, screen transitions, etc.) are required. In order to operate the services, functions, etc. by a Web application, essentially, a configuration in which a Web server and a client terminal are connected to each other via a network is required; however, in many cases, such a configuration cannot be prepared for executing the demo.

On the other hand, for example, in some cases, a demo environment is realized as a configuration in which a Web application is executed in a stand-alone environment of only a client terminal by introducing a Web server program to the client terminal for demo and causing a Web server function to work in local. However, in such a configuration, the load on the client terminal becomes large. On the other hand, it is generally carried out to create an application operable in a stand-alone environment of only a client terminal and use that for demo or as a prototype. For example, an application program, which can be expanded also as an original Web application program, can be directly developed on the client terminal (for example, see Microsoft, ".NET Framework 4 File System Web Site Project", the Internet <URL: http://msdn.microsoft.com/ja-jp/Library/e5x4xz73>, etc.).

Also, different from the original Web application program, a demo application which can be operated by directly accessing local files in a stand-alone environment without utilizing HTTP (Hyper Text Transfer Protocol) is also created based on the original Web application.

For example, first, access to a Web server is made via a Web browser of the client terminal to once operate the original Web application program and display a screen on the Web browser. Herein, the source code of HTML (Hyper Text Markup Language) is displayed by a function of the Web browser, and the paths referencing the files and resources in the Web server therein are converted to the paths, which reference folders or directories corresponding in the local environment of the client terminal, and are then saved in local as HTML files. Moreover, in accordance with needs, paths are converted also for the referenced resources per se in a manner similar to that described above.

Furthermore, the files of the resources are acquired from the Web server and saved in predetermined local paths of the client terminal. The demo application, which is operated in the stand-alone environment of the client terminal, can be created by carrying out the operation of disposing the HTML files and necessary resources in the client terminal side in such a procedure for each of the screens of the necessary screen transition in the Web application.

SUMMARY

According to the conventional technique as described in Japanese Patent Application Laid-Open No. 2003-44474, for example, in the Web server system, the items in the contents can be translated depending on the language environment, etc. of the accessed client terminal, or the contents not limited to be translated, but in a state in which display contents are dynamically changed can be provided.

However, in these techniques, normally, a dictionary or translation table of a single type (for example, for each language environment) is defined for the Web server system. Therefore, for example, if a plurality of business operators which provide respective services in different Web sites by utilizing this system are present, they cannot display the contents which are different in respective Web sites with respect to a single item in a single language environment (in other words, different dictionary data cannot be set for this item). Moreover, even in a single Web site, in some cases, different contents are desired to be displayed in respective screens with respect to a single item.

More specifically, in a large-scale system, the subjects which manage a dictionary such as items in a framework level common in the system, the items which are common in each of subsystems, the items unique to screens, etc. are different in many cases, and management becomes cumbersome with one large dictionary. Thus, there has been a problem that changing takes time in many cases. Moreover, in a case in which the dictionary is divided and segmentalized depending on the management subjects, there has been a problem, for example, that it is difficult for developers of Web applications to understand which dictionary is to be referenced.

On the other hand, in a registration-based business system of a Web server, depending on languages, the number of characters and full/half-width characters of input/output items which are displayed on the screen of the client terminal or subjected to input from the screen, a method of checking input values, etc. are different. Therefore, only changing the names of the displayed input/output items depending on changes of language environments is not complete. Even when a dictionary for changing the names is implemented, eventually, there have been needs to correct programs and source code for, for example, a process of checking the values and attribute values of the input/output items individually for each language environment.

Therefore, it is an object of the present invention to provide a dictionary system and a dictionary invoking method that can dynamically change a display format of a single item displayed on a screen in a Web application to the contents which are different in different levels such as in respective language environments, respective Web sites, and respective screens.

On the other hand, in the conventional technique as described in Japanese Patent Application Laid-Open No. 2012-8805 about automatic generation of source code about user interfaces and display controlling of screen controls (parts), development load on users about disposition and layout of the screen controls can be reduced, and the layout can be optimized in some degree.

Herein, a CRUD-type Web application, etc., for example, often employ a layout of a form in which a text control for displaying a text representing the contents or title of the item is normally disposed as a set with a control of an input field for specifying an input item with respect to a database, and many such sets are displayed for each input/output item.

Regarding this point, in the techniques about display controlling like the conventional techniques, adjustment, etc. of automatic disposition and layout can be carried out independently by single input fields and text controls; however, adjustment, etc. of the layout with consistency in an input/output item unit, in other words, in the state in which the input field and the text control are integrated are not taken into consideration. As a result, for example, with respect to a displayable region on the screen, collapses occur, for example, the text control is subjected to a line break at an unintended location or is adversely not subjected to a line break at an intended part; and, as a result of automatically adjusting the layout, an unintentional collapse may occur, for example, the display width, etc. are different for each of the input/output items. Also in a case in which the appearance of a screen control such as a radio button is different depending on a display device or a platform, an unexpected collapse of layout may occur.

On the other hand, implementing uniform adjustment of the layout of, for example, the set of an input field and a text control corresponding to each input/output item in a whole screen by individual development by manual operations by a user is extremely cumbersome and has bad efficiency.

Therefore, another object of the present invention is to provide a Web server system and a screen-control displaying method that can uniformly adjust, in a set unit in the whole screen, the layout of the set making up a plurality of screen controls for displaying input/output items on the screen in a Web application.

Moreover, according to the conventional techniques, for example, for a Web application already developed, a demo application which operates in a stand-alone environment of a Web browser in a client terminal, etc. can be created by converting paths, etc. of HTML source code output for each screen of a screen transition and then saving files, resources, etc. in local by using the above described method. However, the above described method includes extremely many processes and procedures for creation by manpower and is cumbersome, and the possibility of occurrence of omission, etc. in the conversion of the paths, etc. is high.

Therefore, it is another object of the present invention to provide a Web server system and a demo-application generating method that easily generate a demo application which is operable in a stand-alone environment for a Web application in an operable state.

The above and other objects and novel characteristics of the present invention will be apparent from the description of the present specification and the accompanying drawings.

The following is a brief description of an outline of the typical invention disclosed in the present application.

A dictionary system according to a typical embodiment of the present invention is a dictionary system for providing dictionary data to a Web server system providing a service by invoking a corresponding business logic in response to a request from a client terminal and responding a processing result to the client terminal, the dictionary system, and includes a plurality of types of dictionary tables having a hierarchical structure, the dictionary table having a large applicable range serving as a higher level regarding a range to which the dictionary data is applied; and a dictionary processing unit for acquiring the dictionary data corresponding to a specified key from the specified dictionary table; and characterized in that when the dictionary data is to be acquired from the dictionary table, the dictionary processing unit receives specification that the dictionary table of which hierarchy of the hierarchical structure is to be referenced and, if the dictionary data corresponding to the specified key is not present in the dictionary table of the specified hierarchy, sequentially inquires the dictionary table of a further higher level whether the dictionary table has the dictionary data corresponding to the key or not.

Further, a Web server system according to another typical embodiment of the present invention is a Web server system for displaying a screen making up a plurality of screen controls when: a corresponding business logic is invoked in response to a request from a client terminal, an application program providing a service to the client terminal by responding a processing result of the business logic to the client terminal is operated, and the processing result is displayed on a screen of the client terminal, and has the following characteristic.

That is, for each of one or more input/output items of the application program displayed on the screen of the client terminal, a layout of the plurality of screen controls corresponding to the input/output items is adjusted and displayed by a parts object having at least information about a label control for displaying a text representing a name of the input/output item and information about an input/output control for displaying the input/output item in order to carry out input or output.

Further, a Web server system according to another typical embodiment of the present invention is a Web server system for invoking a corresponding business logic in response to a request from a client terminal, operating a Web application program providing a service to the client terminal by responding a processing result of the business logic to the client terminal and displaying the processing result on a screen, and generating a demo application capable of reproducing a predetermined screen transition of the Web application program alone in the client terminal, and has the following characteristics.

That is, when the Web application program generates and outputs a screen to be responded to the client terminal, HTML data is acquired from an output buffer retaining the HTML data of the generated screen, a URL expression or a path included in the HTML data is converted to a first local path using a predetermined directory in the client terminal as a reference, and a path of an existing location of the HTML data is converted to a second local path using the predetermined directory as a reference.

Further, as the demo application, an HTML file making up the HTML data is output to a location represented by the second local path in the client terminal, and each file including a resource referenced by the HTML data is output or copied to a location represented by the corresponding first local path in the client terminal.

Among the inventions disclosed in the application, the advantageous effects obtained by the representatives will be briefly explained as below.

That is, according to a typical embodiment of the present invention, in a Web application, a display format of a single item displayed on a screen can be easily changed dynamically to the contents which are different in different levels such as in respective language environments, in respective Web sites, and in respective screens.

Moreover, according to another typical embodiment of the present invention, in a Web application, the layout of a set making up a plurality of screen controls for displaying input/output items on a screen can be uniformly adjusted in the set unit in the whole screen.

Moreover, according to another typical embodiment of the present invention, for a Web application which is in an operable state, a demo application operable in a stand-alone environment can be easily generated.

BRIEF DESCRIPTIONS OF THE DRAWINGS

Figure 9:
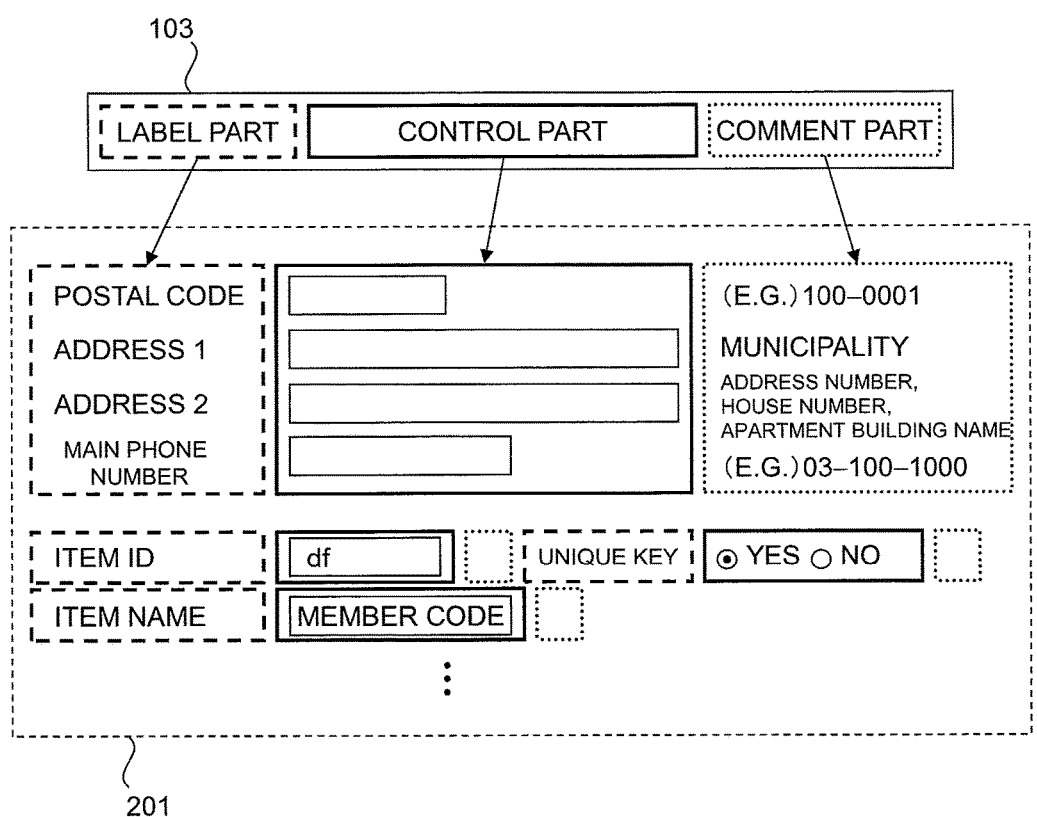
Figure 10A:
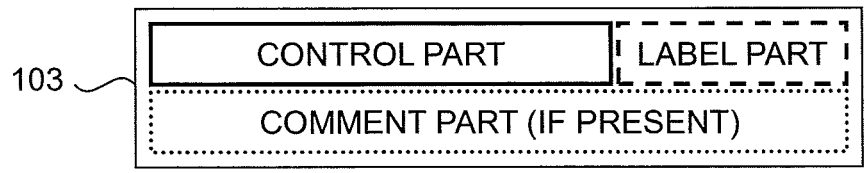
Figure 10B:
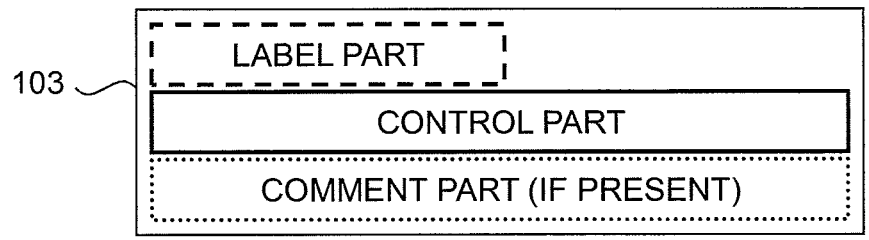
Figure 10C:
Figure 10D:
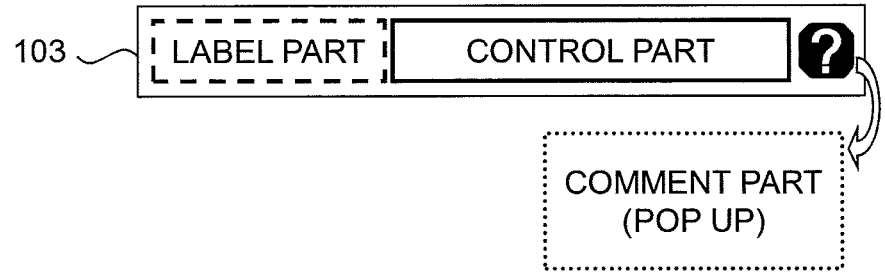
Figure 11:
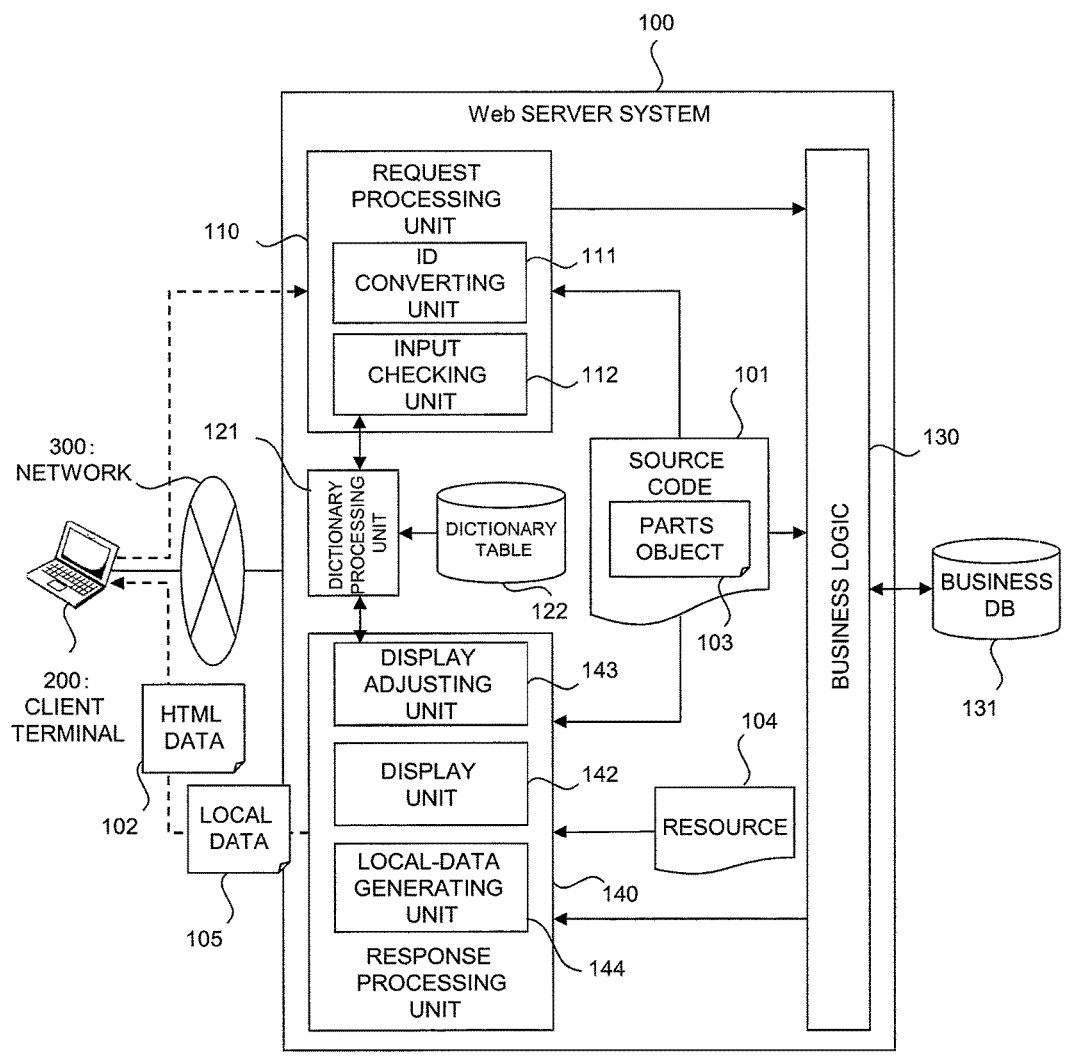
Figure 12:
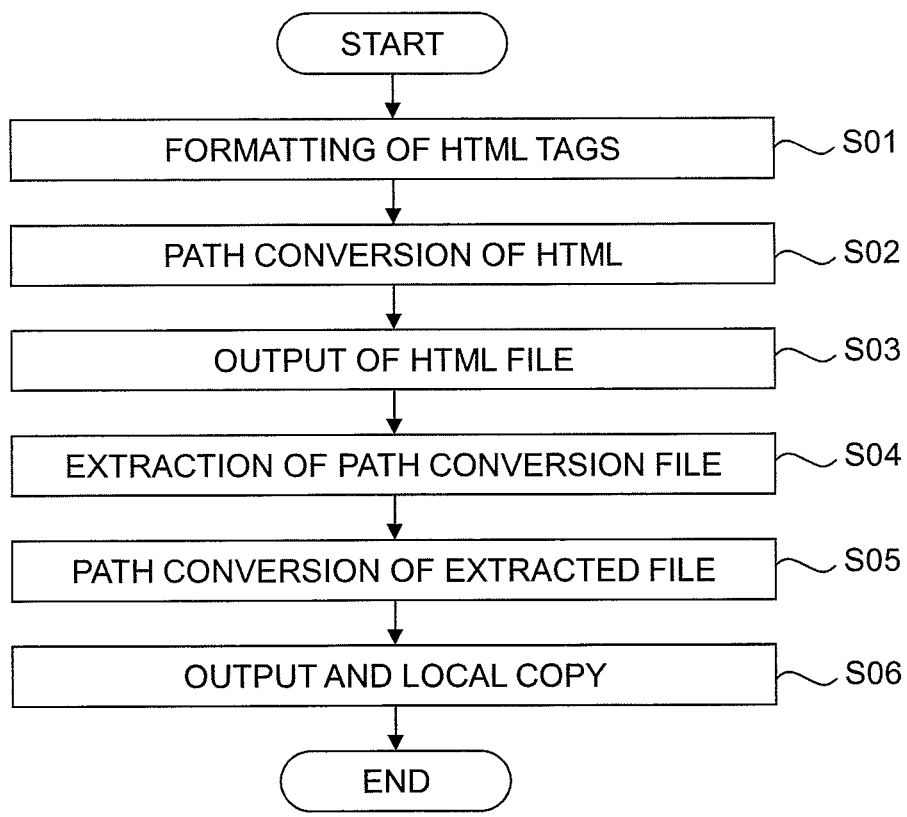

FIGS. 8 (a) to (c) are drawings explaining outlines of implementation examples of layout adjustment in source code of parts objects in the second embodiment of the present invention;

FIG. 9 is a drawing showing an outline of a disposing pattern and a display example of three elements of the parts object in the second embodiment of the present invention;

FIGS. 10 (a) to (d) are drawings showing outlines of other examples of the disposing patterns of the three elements of the parts object in the second embodiment of the present invention; and FIG. 11 is a drawing showing an outline of a configuration example of a Web server system, which is a third embodiment of the present invention; and FIG. 12 is a flow chart showing an outline of an example of a flow of a process of generating local data from HTML data in the third embodiment of the present invention.

DETAILED DESCRIPTION OF PREFERRED EMBODIMENTS

As below, embodiments of the invention will be explained in detail with reference to the drawings. Note that, in all drawings for explanation of the embodiments, the same members basically have the same signs and their repetitive explanation will be omitted.

[First Embodiment]

A Web server system having a dictionary system, which is a first embodiment of the present invention, creates and retains dictionaries for respective language environments in order to enable provision of user interfaces in a plurality of languages without changing source code. The dictionaries not only retain simple translations of text data such as display names by the languages, but are also able to manage various attribute information, etc. of items as data dictionaries. In other words, the information unique to the languages in the user interfaces can be retained, as the dictionary data, in the user interface.

By using such dictionaries, for example, application development can be simultaneously carried out in parallel in a plurality of languages, and supported languages can be easily added, thus expandability can be improved. Moreover, because of the usage as the data dictionaries, data items can be standardized in the system.

In the present embodiment, for example, in a CRUD-type Web application program which accesses a business database, in order to display contents about input/output items on a screen (for example, input items for specifying the contents of search conditions for acquiring data from the business database, output items displaying the contents of search results), instead of directly using standard control objects (hereinafter, simply described as "controls" in some cases), parts objects in which data of display names, set contents and controlling processing of the controls, and explanatory texts is integrated as described later are used.

The parts object can specify, as parameters, what kind of controls (for example, only text control, (text control and) an input field, (text control and) a drop-down list, etc.) are to be displayed on a screen. Moreover, attribute values of the controls (for example, the contents of the text displayed in a text control, the length of an input field, etc.), controlling information (for example, the manner of carrying out a validity check of input data, etc.), etc. can be also specified, and the parts object is implemented so that the controls are displayed and controlled in accordance with the specified contents.

In other words, the parts object is configured to display, in combination, an input/output control, which handles data of an input/output item such as an input field, a drop-down list, and a text, and a label control, which is a text control displaying a name, etc. of the input/output item, and the parts object has a configuration that the pattern of outputting these controls can be specified.

In this process, the label control and the input/output control can be collectively subjected to adjustment of the attribute values such as the width of the control in the form with consistency. Therefore, a cumbersome process of individually specifying attribute values, etc. by a user so that they have consistency is not required, and the appearance of the displayed controls can be adjusted. This adjustment includes, for example, integrally adjusting the display widths of the label control and the input/output control so as to prevent, for example, the label control from being subjected to a line break at an unintended part or reversely from being not subjected to a line break at an intended part with respect to a displayable region.

In the present embodiment, source code is created on the assumption that the Web application program displays the contents about the input/output items on a screen by using the parts objects. More specifically, the controls are displayed indirectly by using the parts objects (parts objects dynamically generate HTML data, scripts, etc. for displaying target controls when executed on the Web server system). Moreover, the information about mapping between columns of a database serving as a target of access and the input/output items on the screen is retained on the source code as mapping information of identification information of the columns of the database (for example, column names) and identification information (for example, ID attribute values of HTML) of the corresponding parts objects.

Furthermore, in the present embodiment, as described later, of the parts objects, the information, etc. about the text to be displayed in label controls and the attribute values and controlling processing of input/output controls is configured to be externally retained, except part thereof, as dictionary data associated with identification information such as IDs of the parts objects or corresponding column names of the database instead of directly specifying that on the source code. As a result of defining the contents of the dictionary data for respective language environments and referencing the dictionary data corresponding to the target language environment upon execution, the appearance, attribute, etc. of the controls displayed on the screen by the parts objects can be dynamically changed depending on the language environment without changing the once-generated source code.

Moreover, a function commonly owned by the parts objects such as access to the above described dictionary data is implemented in a class of an inheritance source, and the class is inherited upon development to create parts objects, so that a Web application program can be developed without implementing the function of the parts objects every time by a developer.

<System Configuration>

Figure 1:
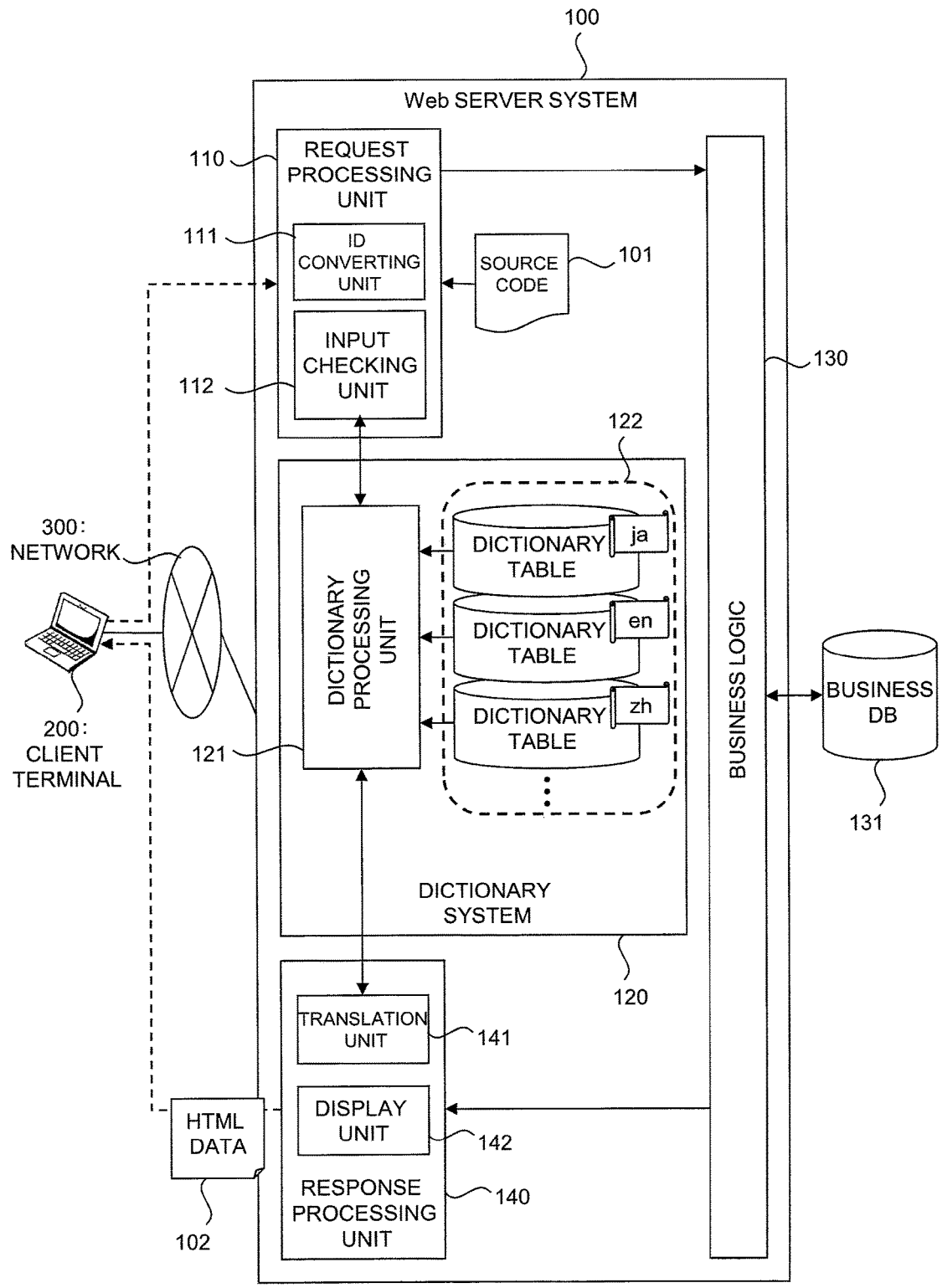
FIG. 1 is a drawing showing an outline of a configuration example of a Web server system, which is a first embodiment of the present invention.

FIG. 1 is a drawing showing an outline of a configuration example of a Web server system, which is a first embodiment of the present invention. A Web server system 100 includes computer equipment such as server equipment or a virtual server in a cloud-computing environment. In addition to an OS and middleware such as a DBMS (DataBase Management System) and a Web server program, which are not shown, the Web server system 100 has units such as a request processing unit 110 implemented by source code 101 created by a user or a software program such as a library or object invoked therefrom, a dictionary system 120, business logic 130, and a response processing unit 140.

With respect to a request from a program such as an unshown Web browser in a client terminal 200 connected via a network 300 such as the Internet, the Web server system 100 accesses a business database (DB) 131 and carries out processing by the business logic 130, and makes a response by outputting HTML data 102 to the client terminal 200, thereby providing a service.

The request processing unit 110 has a function to receive a request from the client terminal 200 and invoke contents (business logic 130) based on the corresponding source code 101 and has units such as an ID converting unit 111 and an input checking unit 112 implemented by a software program(s). The ID converting unit 111 has a function to convert identification information (ID) of parts objects, which are included in request messages and corresponding to input items on a screen, to identification information of columns (for example, column names) of the business DB 131 corresponding to the input/output items based on mapping information retained in the source code 101.

This mapping information retains the correspondences between the identification information (for example, ID attribute values of HTML) of the parts objects displayed on the screen and the identification information of the columns (for example, column names) of the business DB 131 serving as an access target. Therefore, as described later, each parts object disposed on the screen by the source code 101 first acquires the column name corresponding to the ID of its own by the ID converting unit 111, and, then, a subsequent process such as access to the business DB 131 or acquisition of dictionary data from a later-described dictionary table 122 can be carried out while using the column name as a key.

Therefore, on the HTML data 102 responded to the client terminal 200, the corresponding column name of the business DB 131 is not required to be directly specified as the information of, for example, a key in (a control displayed by) each parts object, and the ID of its own can be used as the information of, for example, a key; therefore, security can be enhanced by hiding the actual column name from the HTML data 102. Instead of carrying out such conversion, the column name of the business DB 131 corresponding to (a control displayed by) each parts object may be configured to be directly specified as the information of, for example, a key on the HTML data 102.

The input checking unit 112 has a function to carry out a general validity check(s) about the contents of the data of the input items specified via (the controls displayed by) the parts objects on the screen included in the request messages. The conceivable types of the validity checks include, for example, format checks of the number of characters or character types (numbers, alphabet, kana, full/half-width characters, etc.), limitations on usable characters, time and date, various code values, etc.

The contents of the validity checks can be different depending on a language environment. Therefore, in the present embodiment, the types of the validity checks having a plurality of patterns which have taken variations of each language into consideration are implemented in the input checking unit 112, and which one of the types is to be used for a target input item is selected/determined depending on the language environment. In this case, access to the dictionary table 122 of a target language is made via the later-described dictionary system 120, and the information of the type of the validity check is acquired and determined from the contents of the dictionary data corresponding to the target input item.

The dictionary system 120 has, for example, a dictionary processing unit 121 and dictionary tables 122, which are implemented for example by a database and file tables. The dictionary processing unit 121 has a function to acquire the dictionary data for the specified key (in the present embodiment, for example, the column name of the business DB 131 corresponding to the target input/output item (parts object)) from the dictionary table 122 of a specified language and output the dictionary data. The specification of the language may be, for example, acquired from the language environment of the Web browser included in the request message from the client terminal 200; alternatively, languages are defined respectively for the Web sites which work on the Web server system 100, and the values thereof may be acquired. The example of FIG. 1 shows that the dictionary tables 122 of the languages of Japanese ("ja"), English ("en"), and Chinese ("zh") are retained.

As described later, the dictionary tables 122 have a hierarchical structure corresponding to applicable ranges and management subjects, thereby enabling implementation of the dictionary tables 122, which are different for respective Web sites, respective screens, etc., by minimum resources.

The contents and formats of the dictionary data in the dictionary tables 122 are not particularly limited. In the present embodiment, as a simple method, for example as described later, various data (for example, attribute values of parts objects for carrying out input/output, parameters necessary for controlling) necessary for carrying out input/output processes of data to/from target columns of the business DB 131 via the screen is specified by, for example, comma delimitation in a predetermined order. Specifically, conceivable examples thereof include: a display name which is a content of displaying a label control in a corresponding parts object; the length (the number of characters) of displaying an input field as an input/output control; specifications about the contents of a control process such as the type of the validity check and the mode of IME; a shortened display name, which is a shortened text of list display of output data in a table, and a display width; and a value list of display by, for example, a drop-down list.

In the example of FIG. 1, the dictionary system 120 is configured to be implemented on the Web server system 100, but is not limited thereto. The dictionary system 120 may be independently built on server equipment which is different from the Web server system 100.

The business logic 130 has a function to carry out processing as a business application by utilizing the business DB 131. As described above, the present embodiment uses a CRUD-type application for the business DB 131 as a target, but is not particularly limited thereto.

The response processing unit 140 has a function to generate the HTML data 102 based on the processing results of the business logic 130, etc. based on the contents of the source code 101 and make a response to the client terminal 200 and has units such as a translation unit 141 and a display unit 142, which are implemented by a software program(s). The translation unit 141 acquires, for output items included in the response, the texts of label controls for displaying the corresponding parts object in a target language environment and the parameter values of attribute values, controlling information, etc. of input/output controls. In this case, the translation unit 141 accesses the dictionary table 122 of the corresponding language via the dictionary system 120 and acquires various parameter values of display names, attribute values, etc. from the dictionary data corresponding to the target output items (parts object).

The display unit 142 has a function to generate the HTML data 102 of a response screen, in which controls displayed by the parts objects are disposed, based on the texts of the label controls and the parameter values of the attribute values, controlling information, etc. of the input/output controls about the parts objects acquired by the translation unit 141.

<Screen Display Processing>

Figure 2:
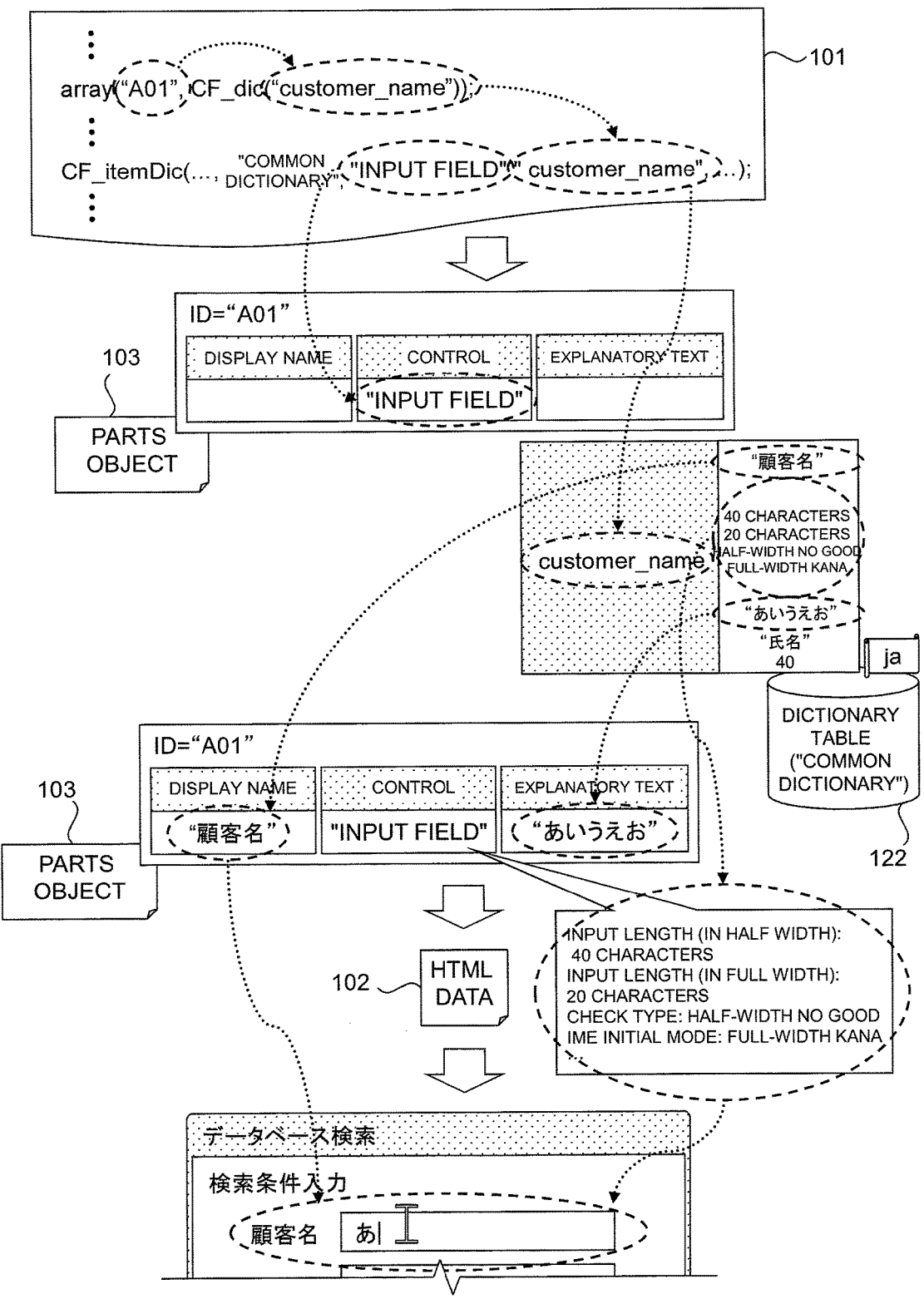
FIG. 2 is a drawing showing an outline of an example of a process of displaying, on a screen, an input/output item of a corresponding column by a parts object in the first embodiment of the present invention.

FIG. 2 is a drawing showing an outline of an example of a process of a case in which an input/output item of a corresponding column is displayed on a screen by a parts object of a CRUD-type application. In the example of FIG. 2, an example of a case in which an input field specifying "customer name" is displayed on a screen of inputting a search condition for reading data from the business DB 131 in a Japanese environment is extracted and shown.

In the source code 101 of a Web application program shown in an upper level of the drawing, a parts object 103 is invoked for displaying the input field which specifies "customer name". Specifically, first, the information of the column name ("customer_name") corresponding to an ID ("A01") is acquired from the mapping information (in the example of FIG. 2, retaining a correspondence relation by array ()) retained on the source code 101.

Then, for example, instances are invoked in the form of creating them about subclasses succeeding a class implementing the function of the parts object 103 ("CF_itemDic( )"). The example of FIG. 2 shows, in a simplified manner, a state in which the type ("common dictionary") of the dictionary table 122 to be invoked, the type ("input field") of an input/output control to be displayed, an ID attribute value ("A01") of HTML, etc. are specified and invoked as part of parameters. The ID attribute value ("A01") of HTML is dynamically converted to a column name ("customer_name") according to the mapping information.

The parts object 103 invoked by such a code retains, as data, the data including at least a display name (text of a label control) and the information about the contents of an input/output control to be displayed. As shown in FIG. 2, other information such as an explanatory text may be further retained. In the example of FIG. 2, among above described three pieces of information of the parts object 103, about a control, "input field" is specified as a parameter in the source code 101 and is therefore set.

The invoked parts object 103 further accesses the target dictionary table 122 ("common dictionary") in the Japanese environment ("ja") via the dictionary processing unit 121 of the dictionary system 120 by, for example, a predetermined function and a method and acquires dictionary data (in the present embodiment, a set of a plurality of values of "顧客名", 40 characters, 20 characters, etc.) corresponding to the column name ("customer_name").

In the example of FIG. 2, information such as a name (a text to be displayed in a label control), the length in the case of an input field (the number of characters in the case of half-width characters), the maximum length in the case of an input field (the number of characters), the type of a validity check of input data, the initial mode of IME, an explanatory comment, a text (display name) in the case of a list display in a table, and a display width (pixel value) in the case of a list display in the table, is retained in this order from the upper side as the dictionary data of the dictionary table 122. An output format of acquiring the dictionary data may be, for example, a series of character strings delimiting these values by commas, etc. or may be easily accessible data such as an associative array.

Regarding the dictionary table 122, in consideration of processing efficiency, it is desired to expand the contents of the dictionary data onto a memory upon initial processing or first access. In this case, if all of the dictionary data is expanded, processing efficiency is adversely reduced in some cases, for example, a memory usage volume is occupied, or an expanding process takes time. Therefore, in terms of implementation, it is desired to enable expansion of the dictionary data of a necessary range onto the memory when needed.

Figure 3:
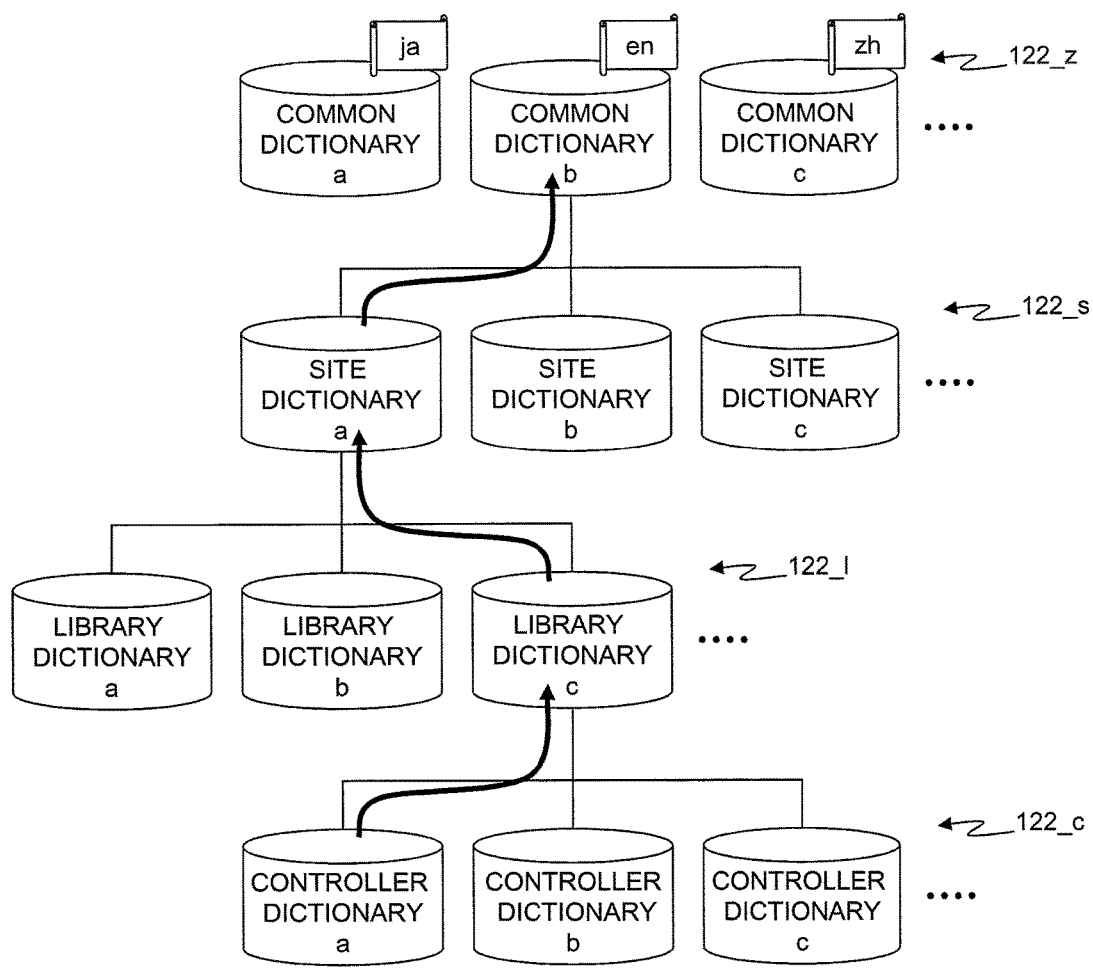
FIG. 3 is a drawing showing an outline of an example of a hierarchical structure of dictionary tables in the first embodiment of the present invention.

Therefore, the present embodiment has the hierarchical structure making up the plurality of dictionary tables 122 having different applicable ranges and management subjects, and these are configured to be appropriately selected and used. FIG. 3 is a drawing showing an outline of an example of the hierarchical structure of the dictionary tables 122. The hierarchical structure has, for example, sequentially from a higher level, the plurality of types of dictionary tables 122 having different applicable ranges and management subjects such as a plurality of common dictionaries 122_$z$ serving as the dictionary tables 122, which are common to respective language environments of systems or applications working on the Web server system 100, a plurality of site dictionaries 122_$s$ which are common only in specified Web sites, a plurality of library dictionaries 122_$l$ which are common only in subsystems, and a plurality of controller dictionaries 122_$c$ of screen units (note that part of the hierarchical structure is extracted for illustration, and the other part is omitted).

This case may be configured so that, for example, if corresponding dictionary data cannot be obtained by referencing a dictionary having a narrow applicable range such as the controller dictionary 122_$c$ of a lower-level layer, the dictionary tables 122 in the higher level (having larger applicable ranges) can be reversely referenced in the order of the library dictionary 122_$l$→the site dictionary 122_$s$→the common dictionary 122_$z$. In this case, permission/non-permission of carrying out reverse referencing by each hierarchy may be definable, or permission/non-permission of referencing per se of the dictionary tables 122 by each hierarchy may be definable.

For example, if reverse referencing to the library dictionary 122_$l$ is permitted in a case in which the corresponding dictionary data has not been obtained by referencing a "controller dictionary a" in the drawing, a "library dictionary c" in a higher level is referenced. In this case, if usage of the library dictionaries 122_$l$ is not permitted in the target Web application, it is assumed that the dictionary data has not been obtained; and, if reverse referencing to the site dictionaries 122_$s$ is permitted at the library dictionaries 122_$l$, a "site dictionary a" in the higher level is referenced. If the dictionary data is not obtained finally even if the hierarchical structure is reversed in this manner, default values may be used, or an error may be returned.

By employing such a configuration and using the different dictionary tables 122 depending on the cases, the dictionary data expanded on the memory can be maintained at an appropriate size of only necessary data. Moreover, when for example the site dictionaries 122_$s$ which can set common dictionary data in site units are provided in addition to the common dictionaries 122_$z$, an owner or a manager of a Web site can freely and flexibly create unique dictionary data only in the Web site regardless of the set contents in the other sites. As a result of employing such a hierarchical structure, the dictionary tables 122 in the lower-level layer are only required to define only the differences with respect to the dictionary tables 122 in the higher-level layer, and development productivity can be improved.

Returning to FIG. 2, the parts object 103 extracts necessary data from the acquired dictionary data, and sets that as the parameters for displaying and controlling a control(s). For example, as the attribute values of a case in which an input field is to be displayed as an input/output control, the length of the field acquired from the dictionary data is set, and the type of a validity check, the value of the initial mode, etc. of IME, the contents of an explanatory text, etc. are set. The processing about the validity check of input data and controlling of the input/output control such as mode setting of IME is the functions of the input checking unit 112 and the display unit 142; however, as specific implementation, for example, the functions are defined as methods in a class of an inheritance source of the parts object 103 (that is, the parts object 103 has the functions), or the functions are implemented as the functions which can be invoked by the parts object 103.

By virtue of this, as shown in a screen example in a lower level of FIG. 2, when executed, the parts object 103 can generate the HTML data 102 so as to display the control of the input field for specifying "customer name". In this process, for example, the information of the explanatory text of the parts object 103 can be used as help information, etc. about the input/output item.

If only the control of the input field is displayed when the input field is displayed, what to be input is unknown. Therefore, in the present embodiment, as shown in FIG. 2, a text control ("顧客名") displaying the display name of the input/output item corresponding to the parts object 103 is displayed as a label (label control) adjacent to the input field. The text sets the information of the display name of the retained data of the parts object 103, in other words, the value of the name ("顧客名") of the dictionary data acquired from the dictionary table 122 by the parts object 103.

The processing about generation of the HTML data 102 like this is the function of the display unit 142, etc.; however, as specific implementation, for example, the function is defined as a method in a class of an inheritance source of the parts object 103 (that is, the parts object 103 has the functions), or the function is implemented as the function which can be invoked by the parts object 103. Note that, herein, as described above, regarding the three elements, i.e., the label control, the input/output control to be displayed, and the explanatory text, the attribute values about appearance, etc. are adjusted collectively in a form with consistency.

In this manner, in the present embodiment, the HTML data 102, which displays the input/output item by the parts object 103, can be generated. Therefore, the CRUD-type application in the present embodiment can be realized by creating the source code 101 so as to dispose the parts object 103 on the screen in accordance with predetermined rules as the input/output item corresponding to the respective columns of the business DB 131 and combine that with implementation of standard functions and operations. A function to automatically generate such source code 101 can be implemented as, for example, an application-program development supporting system.

For example, as an application which registers (C: Create) entries with respect to the business DB 131, the source code 101 is created so as to dispose the parts objects 103, which are for displaying input fields for specifying data to be registered on the screen with respect to the columns of the business DB 131, in accordance with the arranged order of the columns of the business DB 131. In this process, the correspondence relations between IDs of the controls to be subjected to screen display and the names of the columns are retained as mapping information in accordance with needs. Furthermore, a "register" button, a "cancel" button, etc. for executing registration of the entries with respect to the business DB 131 as the standard functions are disposed. Furthermore, in the dictionary tables 122 of respective language environments, information such as attribute values and controlling information used for displaying controls for the parts objects 103 is retained as dictionary data. In this process, if there is no particular specification about items, they are set by default values, respectively.

For example, as an application which carries out search (R: Read) with respect to the business DB 131, as well as the above description, the source code 101 is created so as to dispose the parts objects 103, which are for displaying input fields for specifying conditions for searching the business DB 131 on the screen. In this process, it is excessive to specify all the columns of the target table of the business DB 131 as search conditions; therefore, simplification such as tentatively displaying input fields only for top five columns is carried out, and they may be changed thereafter. Moreover, in accordance with needs, the correspondence relations between IDs of the controls to be subjected to screen display and the names of the columns are retained as mapping information. Furthermore, as a standard function, a "search" button, etc. for searching the entries of the business DB 131 are disposed.

Moreover, for example, a table (chart) control for displaying a search result(s) is automatically disposed in a lower part of a region in which the search conditions are input. Herein, for example, the contents corresponding to invoking of the parts objects 103 corresponding to the columns of the business DB 131 are set in an item definition array of the table control object. As a result, the display unit 142 or the parts objects 103 can be implemented so that the contents of the columns of the business DB 131 are displayed in respective rows of the table control.

Figure 4:
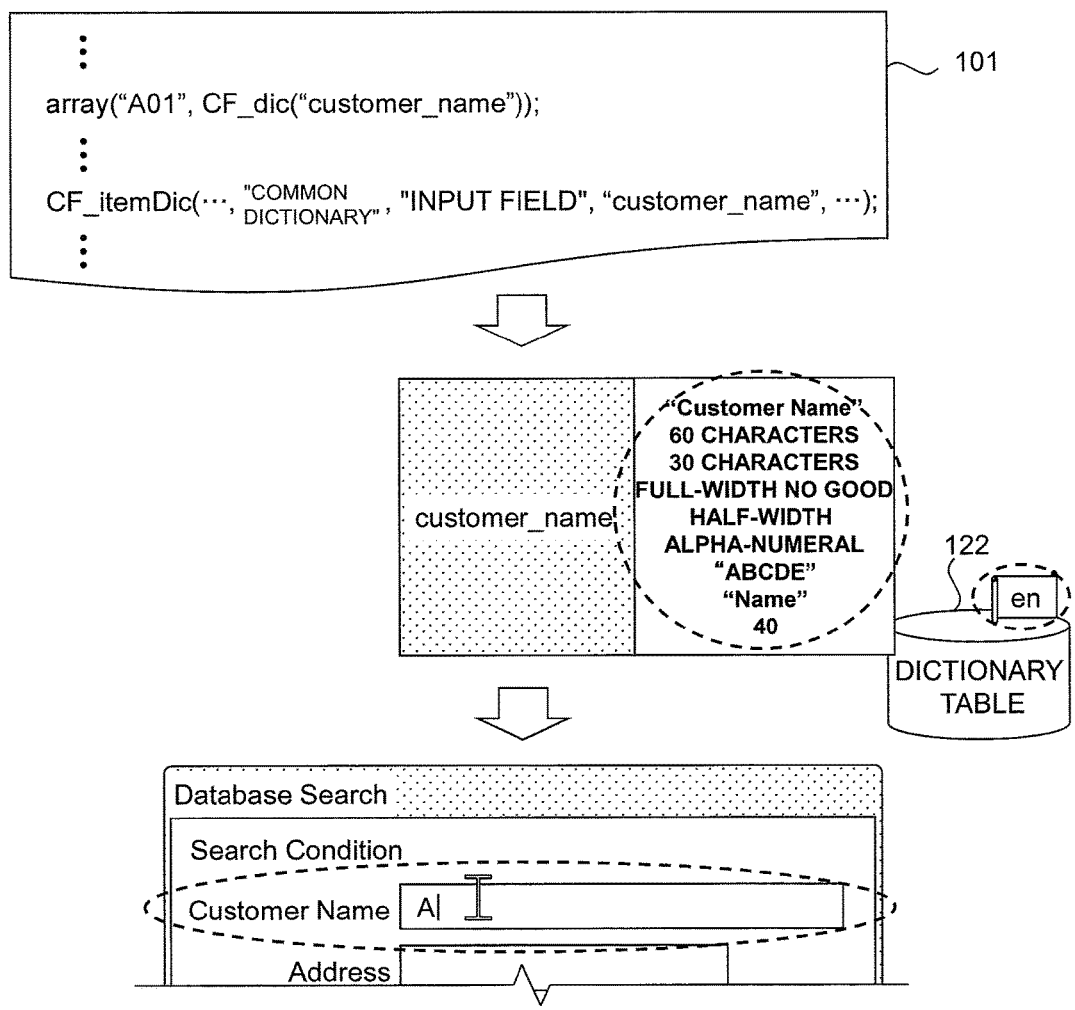
FIG. 4 is a drawing showing an outline of an example of a process of changing the appearance, etc. of the controls displayed by the parts object to another language in the first embodiment of the present invention.

The Web application can be caused to support another different language in this state without changing the contents of the source code 101 by preparing the dictionary table 122 of the target language. FIG. 4 is a drawing showing an outline of an example of processing for changing the appearance, etc. of a control displayed by the parts object 103 to another language. In this case, the dictionary table 122 of an English environment ("en") is newly created without changing the contents of the source code 101 shown in the example of FIG. 2.

As a result, upon execution of the Web application, the parts object 103 references the contents of the entries of the target dictionary table 122 in the English environment ("en") and, in accordance with the contents, the parts object 103 can dynamically change to the English environment, not only the text data of the label control serving as a display name as shown in the screen example in a lower level of FIG. 4, but also the attributes, etc. (in the example of FIG. 4, the length (width) of the input field, the contents of a validity check of input data, IME mode, etc.) of the input/output control.

Figure 5:
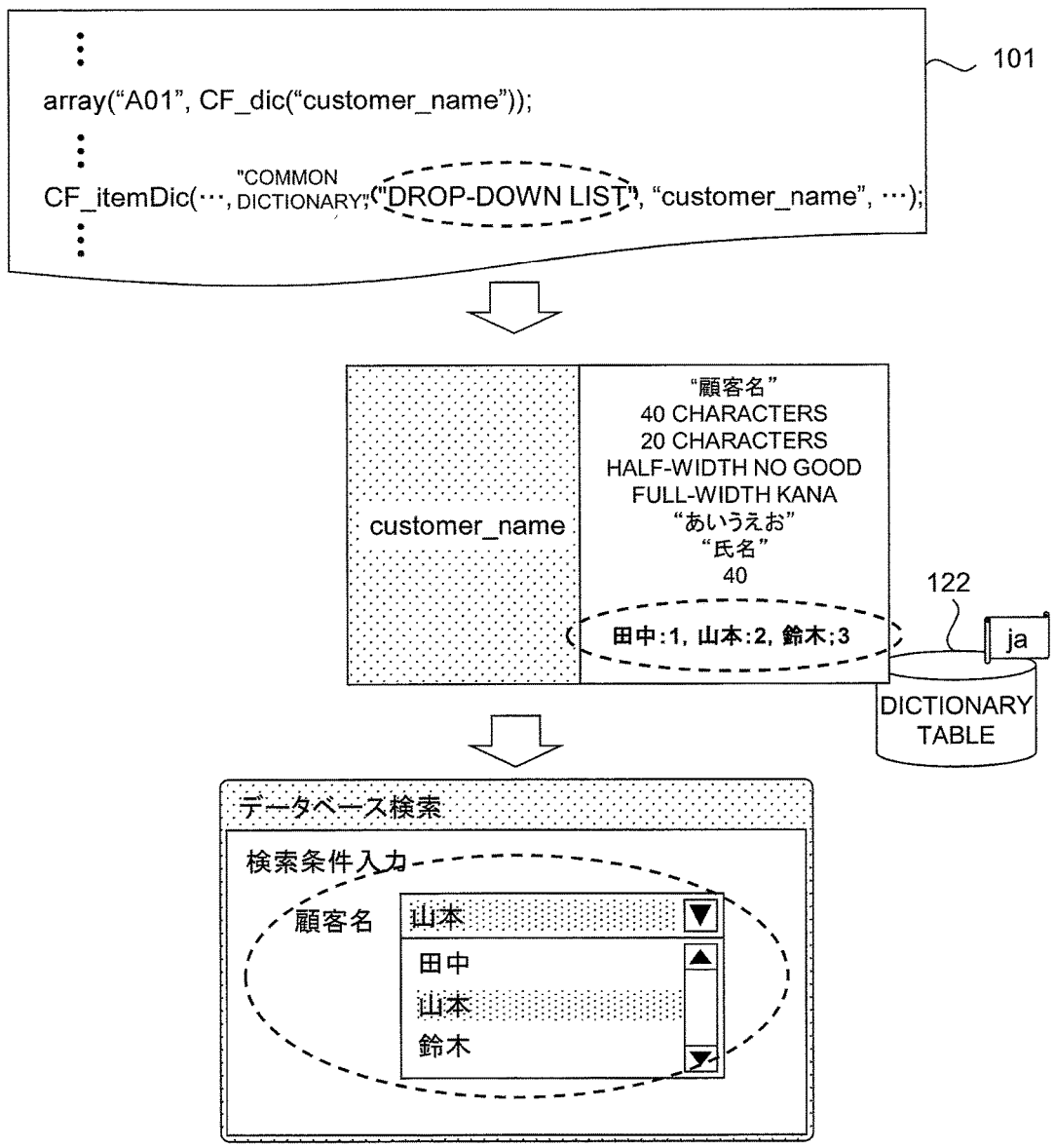
FIG. 5 is a drawing showing an outline of an example of a process of changing the appearance, etc. of the controls displayed by the parts object in the first embodiment of the present invention.

FIG. 5 is a drawing showing an outline of an example of a process of changing the appearance, etc. of a control displayed by the parts object 103. In this case, a simple change has been made in the contents of the source code 101 shown in the example of FIG. 2. Specifically, upon invoking of the parts object 103, the parameter of the type of the input/output control to be displayed has been changed from "input field" to "drop-down list". Moreover, in the dictionary table 122, the contents of a value list ("田中: 1, 山本: 2, . . . "), which are to be set in the drop-down list, are additionally defined at the end of the dictionary data.

As a result, upon execution of the Web application, the parts object 103 can generate the HTML data 102 so as to change the display contents of the input/output item by an input/output control of the specified type. In the example of FIG. 5, regarding the single parts object 103, the input/output control is changed from the input field to the drop-down list; however, for example, if the parameter of the type of the input/output control is set to "text", the parts object 103 displays values as texts. It is also possible to display only either one of the label control and the input/output control. If the parameter is set to "hide", although data is internally retained, no control is displayed about the input/output item on the screen display.

As explained above, according to the Web server system 100 having the dictionary system 120, which is the first embodiment of the present invention, the information (including not only text data such as the display names of input/output items, but also the values of data items of various attribute information, etc.) unique in the languages in user interfaces of the Web application program is retained in the dictionary tables 122 of the respective language environments as dictionary data. When the Web application displays an input/output item on the screen, the Web application indirectly displays a standard control by using the parts object 103 instead of directly using the standard control.

The parts object 103 acquires the corresponding dictionary data from the dictionary table 122 corresponding to the language environment and, based on the contents thereof, dynamically changes the user interface including the appearance, attribute, controlling processing, etc. of the control for displaying the input/output item on the screen. As a result, the user interface can be dynamically changed in accordance with the language environment without changing the source code 101 of the application.

The dictionary tables 122 are configured to have the hierarchical structure corresponding to the applicable ranges and management subjects, and the different dictionary tables 122 are used depending on the cases; as a result, the dictionary data expanded on the memory can be maintained to an appropriate size of an only necessary amount. Moreover, for example, the site dictionaries 122_s which are common in respective sites are provided; as a result, the owner or manager of a Web site can freely and flexibly create the dictionary data which is unique only in the Web site regardless of the set contents in the other sites. Moreover, as a result of employing such a hierarchical structure, only the differences with respect to the dictionary tables 122 in the higher-level layer are required to be defined in the dictionary tables 122 in the lower-level layer, and development productivity and manageability can be improved, for example, exception setting in a particular screen is configured to be easy with respect to the definitions in a basic subsystem unit. By virtue of above described effects, supporting the providing form of a service such as SaaS (Software as a Service) becomes easy.

The present embodiment employs a standard CRUD-type Web application as a target, but is not limited thereto. With respect to unique applications (not limited to Web applications, but may be client/server types, stand-alone types, etc.) which are built by a user(s) to include operation contents such as user interfaces and business logic by the form of combination of the dictionary tables 122 and the parts objects 103, multiple languages can be supported by defining the dictionary tables 122 of respective language environments according to similar ideas.

Moreover, in the present embodiment, the common dictionaries 122_z are provided to support the language environments, but are not limited thereto; for example, a usage method in which the common dictionaries 122_z are individually defined for data items having different names and meanings depending on areas, business categories, etc. may be used. Moreover, in the present embodiment, the case in which various attribute information, etc. of the input/output items are retained as data dictionaries in the dictionary tables 122 is taken as an example; however, also in the case in which translation texts are retained in respective languages for text data such as display names, effects similar to those described above can be obtained by employing the hierarchical structure.

Moreover, in the present embodiment, the parts object 103 is configured to have the function (method) for invoking the dictionary system 120 and accessing the dictionary tables 122; as a result, a common interface for accessing the dictionary tables 122 from the controls on the screen is provided to improve development productivity. However, from a viewpoint of utilization of the dictionary system 120, the configuration is not limited to such a configuration. It is also possible to provide a description so that the dictionary system 120 is directly invoked on the source code 101 to acquire dictionary data for the controls on the screen without using the parts object 103.

[Second Embodiment]

A Web server system, which is a second embodiment of the present invention, for example, for a set making up a plurality of screen controls for displaying input/output items, etc. on the screen in a CRUD-type Web application program which accesses the business database, is a Web server system which can uniformly adjust the layout, attributes, etc. in the set unit in the whole screen.

Herein, as well as the first embodiment, in a function of displaying the screen per se and/or controls displayed on the screen, as described later, the screen controls (parts) are configured by using parts objects making up logical element units of input/output items, which are different from normal controls in HTML element units.

More specifically, like the input/output field and the text control described above, the plurality of controls disposed as the set are configured as a parts object using them as elements. The parts object can specify, as parameters, what kind of controls (for example, only text control, (text control and) an input field, (text control and) a drop-down list, etc.) are to be displayed on a screen. Moreover, attribute values of the controls (for example, the contents of the text displayed in a text control, the length of an input field, etc.), controlling information (for example, the manner of carrying out a validity check of input data, etc.), etc. can be also specified, and the parts object is implemented so that the controls are displayed and controlled in accordance with the specified contents.

In other words, the parts object is configured by combining a logical element corresponding to an input/output control, which handles data of an input/output item such as an input field, a drop-down list, and a text; a logical element corresponding to a label control, which is a text control displaying a name, etc. of the input/output item; and a logical element corresponding to a comment control displaying an explanatory text about the input/output item. The parts object has a configuration that the actual pattern of displaying/outputting these controls corresponding to these elements can be specified to be independent from the set of the logical elements. More specifically, the parts object has a configuration that the set of the screen controls independent in the logical element units of the input/output items is created, and layout information is independent therefrom.

As a result, for the plurality of screen controls serving as the elements, the layout can be uniformly and collectively adjusted with consistency in one or more parts objects. Moreover, since the parts objects and the input/output items correspond to each other one-on-one, it becomes easy to externally retain parameters, attribute values, etc. for the controls as dictionary data collectively as described later and to manage them in association with the input/output items.

Moreover, the information about layout adjustment among the plurality of screen controls serving as the elements can be defined to be independent from the parts objects, and the load required in the layout adjustment among the controls can be greatly reduced.

The layout adjustment herein, for example, includes, with respect to a displayable region, integrally adjusting the display widths of a label control and an input/output control so as to prevent the label control, for example, from being subjected to a line break at an unintended part or adversely from not being subjected to a line break at an intended part and includes adjusting, integrally with a label control, the display positions, widths, etc. of an input/output control having different appearance depending on a device, OS (Operating System), etc. such as a radio button. More specifically, dynamic layout changes in accordance with user interfaces of a plurality of types of devices and OS can be carried out.

In the present embodiment, source code is created on the assumption that the Web application program displays the contents about the input/output items on a screen by using the parts objects. More specifically, the controls are displayed indirectly by using the parts objects (parts objects dynamically generate HTML data, scripts, etc. for displaying target controls when executed on the Web server system). Moreover, the information about mapping between columns of a database serving as a target of access and the input/output items on the screen is retained on the source code as mapping information of identification information of the columns of the database (for example, column names) and identification information (for example, ID attribute values of HTML) of the corresponding parts objects.

Furthermore, in the present embodiment, as well as the first embodiment, as described later, of the parts objects, the information, etc. about the text to be displayed in label controls and the attribute values and controlling processing of input/output controls is configured to be externally retained, except part thereof, as dictionary data associated with identification information such as IDs of the parts objects or corresponding column names of the database instead of directly specifying that on the source code. As a result, the appearance, attribute, etc. of the controls displayed on the screen by a displaying method of the screen and the parts objects can be dynamically changed without changing the once-generated source code. Note that, the present embodiment is assumed to use dictionaries, but is not particularly limited thereto. Moreover, as well as the first embodiment, the contents of the dictionary data may be defined for respective language environments.

<System Configuration>

Figure 6:
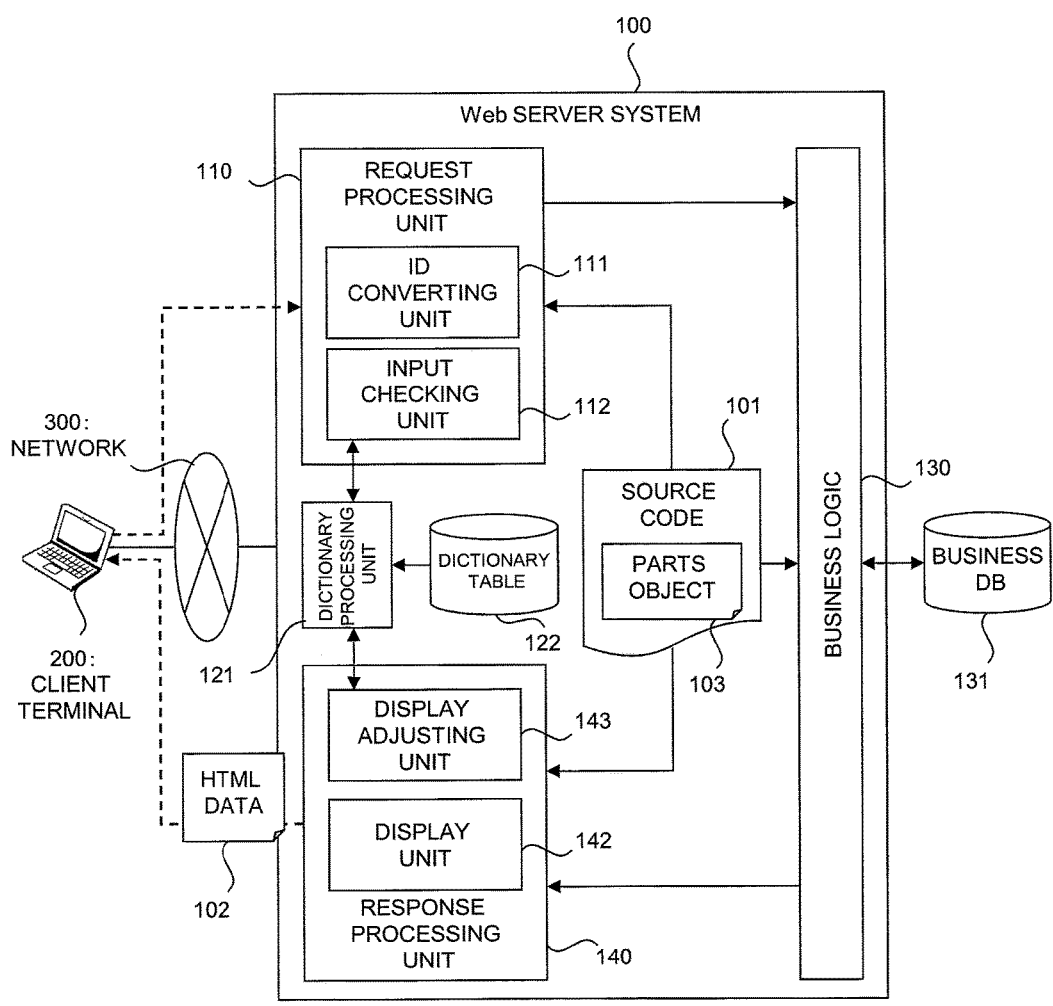
FIG. 6 is a drawing showing an outline of a configuration example of a Web server system, which is a second embodiment of the present invention.

FIG. 6 is a drawing showing an outline of a configuration example of a Web server system, which is the second embodiment of the present invention. A Web server system 100 basically has a configuration approximately similar to the configuration shown in the example of FIG. 1 of the first embodiment and includes computer equipment such as server equipment or a virtual server in a cloud-computing environment. In addition to an OS and middleware such as a DBMS and a Web server program, which are not shown, the Web server system 100 has units such as a request processing unit 110 implemented by source code 101 created by a user or a software program such as a library or object invoked therefrom, a dictionary processing unit 121, business logic 130, and a response processing unit 140.

With respect to a request from a program such as an unshown Web browser in a client terminal 200 connected via a network 300 such as the Internet, the Web server system 100 accesses a business database (DB) 131 and carries out processing by the business logic 130, and makes a response by outputting HTML data 102 to the client terminal 200, thereby providing a service.

The request processing unit 110 has a function to receive a request from the client terminal 200 and invoke contents (business logic 130) based on the corresponding source code 101, and has units such as an ID converting unit 111 and an input checking unit 112 implemented by a software program(s). The ID converting unit 111 has a function to convert identification information (ID) of parts objects 103, which are included in request messages, corresponding to input items on a screen, and described in the source code 101, to identification information of columns (for example, column names) of the business DB 131 corresponding to the input/output items based on mapping information retained in the source code 101.

This mapping information retains the correspondences between the identification information (for example, ID attribute values of HTML) of the parts objects 103 displayed on the screen and the identification information of the columns (for example, column names) of the business DB 131 serving as an access target. Therefore, as described later, each parts object 103 disposed on the screen by the source code 101 first acquires the column name corresponding to the ID of its own by the ID converting unit 111, and, then, a subsequent process such as access to the business DB 131 or acquisition of dictionary data from a later-described dictionary table 122 can be carried out while using the column name as a key.

Therefore, on the HTML data 102 responded to the client terminal 200, the corresponding column name of the business DB 131 is not required to be directly specified as the information of, for example, a key in (a control displayed by) each parts object, and the ID of its own can be used as the information of, for example, a key; therefore, security can be enhanced by hiding the actual column name from the HTML data 102. Instead of carrying out such conversion, the column name of the business DB 131 corresponding to each parts object 103 may be configured to be directly specified as the information of, for example, a key, on the HTML data 102.

The input checking unit 112 has a function to carry out a general validity check(s) about the contents of the data of the input items specified via the parts objects 103 on the screen included in the request messages. The conceivable types of the validity checks include, for example, format checks of the number of characters or character types (numbers, alphabet, kana, full/half-width characters, etc.), limitations on usable characters, time and date, various code values, etc.

As well as the first embodiment, as the contents of the validity checks, for example, the types of a plurality of patterns of validity checks which have taken variations in each language into consideration are implemented in the input checking unit 112, and the type to be used for a target input item is selected/determined in accordance with the language environment. Herein, access to the dictionary table 122 of the target language is made via the later-described dictionary processing unit 121, and the information of the type of the validity check is acquired and determined according to the contents of the dictionary data corresponding to the target input item.

The dictionary processing unit 121 has the dictionary table(s) 122 implemented by, for example, a database and file tables and has, for example, a function to acquire the dictionary data corresponding to a specified key (in the present embodiment, for example, a column name of the business DB 131 corresponding to a target input/output item (parts object 103)) from the dictionary table 122 and output the data. For example, as well as the first embodiment, the plurality of dictionary tables 122 may be prepared for respective categories such as target language environments and business categories of the Web application program, and be subjected to selection and use.

The contents and formats of the dictionary data in the dictionary tables 122 are not particularly limited. In the present embodiment, as a simple method, for example as described later, various data (for example, attribute values of parts objects 103 for carrying out input/output, parameters necessary for controlling) necessary for carrying out input/output processes of data to/from target columns of the business DB 131 via the screen is specified by, for example, comma delimitation in a predetermined order.

Specifically, conceivable examples thereof include: a display name which is a content of displaying a label control in a corresponding parts object 103; the length (the number of characters) of displaying an input field as an input/output control; specifications about the contents of a control process such as the type of the validity check and the mode of IME; a shortened display name, which is a shortened text of list display of output data in a table, and a display width; and a value list of display by, for example, a drop-down list.

In the example of FIG. 6, the dictionary processing unit 121 is configured to be implemented on the Web server system 100, but is not limited thereto. The dictionary system 120 may be independently built on server equipment which is different from the Web server system 100.

The business logic 130 has a function to carry out processing as a business application by utilizing the business DB 131. As described above, the present embodiment uses a CRUD-type application for the business DB 131 as a target, but is not particularly limited thereto.

The response processing unit 140 has a function to generate the HTML data 102 based on the processing results of the business logic 130, etc. based on the contents of the source code 101 and make a response to the client terminal 200, and has units such as a display unit 142 and a display adjusting unit 143, which are implemented by a software program(s).

The display adjusting unit 143 acquires, for output items included in the response, the texts of label controls for displaying the corresponding parts object 103 and the parameter values of attribute values, controlling information, etc. of input/output controls. In this case, the dictionary table 122 of the corresponding language environment, etc. is accessed via the dictionary processing unit 121, and various parameter values of display names, attribute values, etc. are acquired from the dictionary data corresponding to the target output items (parts object 103).

The display unit 142 has a function to generate the HTML data 102 of a response screen, in which controls displayed by the parts objects are disposed, based on the texts of the label controls and the parameter values of the attribute values, controlling information, etc. of the input/output controls about the parts objects acquired by the display adjusting unit 143.

<Screen Displaying Process>

Figure 7:
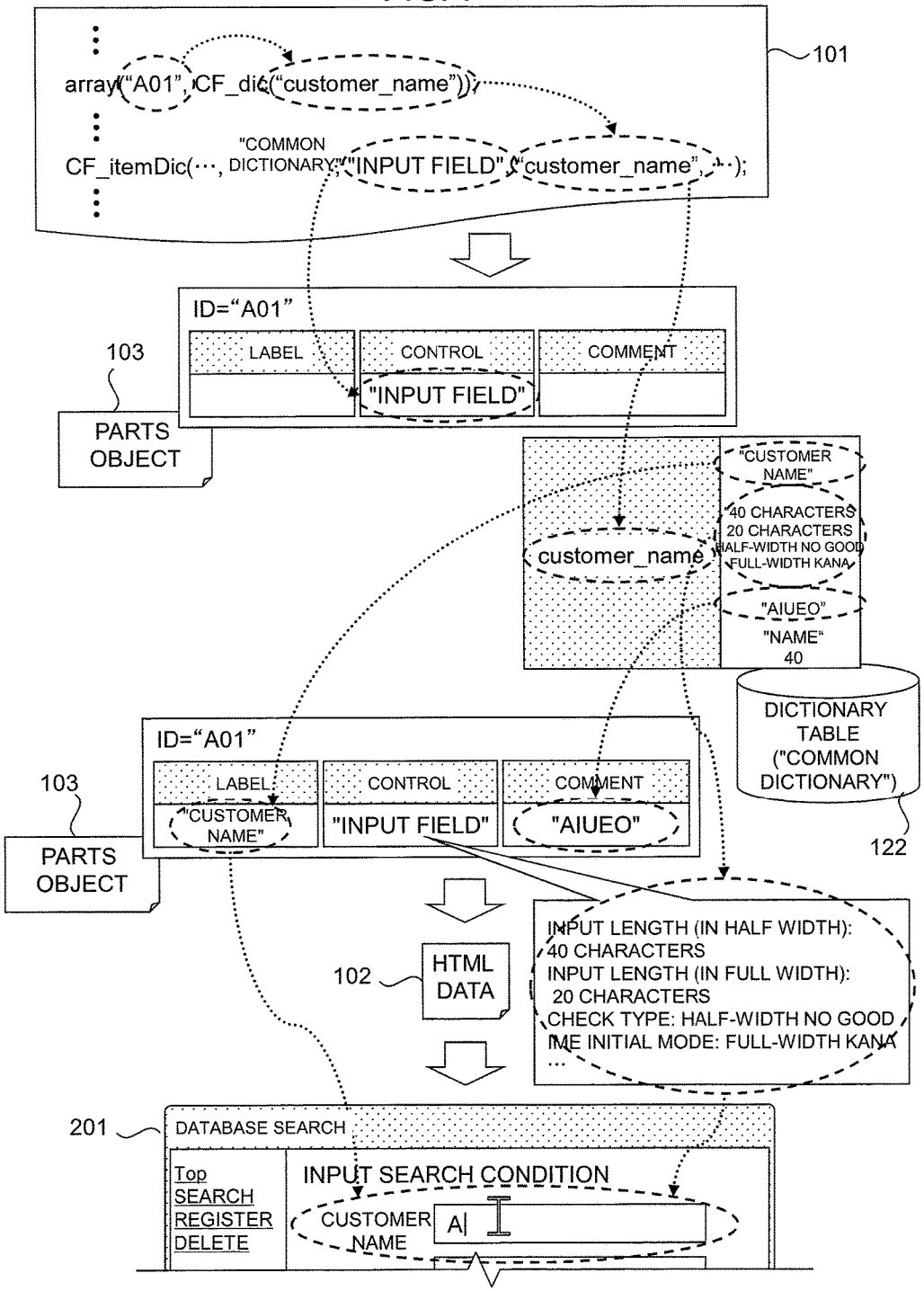
FIG. 7 is a drawing showing an outline of an example of a process of displaying, on a screen, an input/output item of a corresponding column by a parts object in the second embodiment of the present invention.

FIG. 7 is a drawing showing an outline of an example of a process of a case in which an input/output item of a corresponding column is displayed on a screen by the parts object 103 in a CRUD-type application. In the example of FIG. 7, as well as the example of FIG. 2 of the first embodiment, an example of a case in which an input field specifying "customer name" is displayed on a screen of inputting a search condition for reading data from the business DB 131 is extracted and shown.

In the source code 101 of a Web application program shown in an upper level of the drawing, a parts object 103 is invoked for displaying the input field which specifies "customer name". Specifically, first, the information of the column name ("customer_name") corresponding to an ID ("A01") is acquired from the mapping information (in the example of FIG. 7, retaining a correspondence relation by array ( )) retained on the source code 101.

Then, for example, instances are invoked in the form of creating them about subclasses succeeding a class implementing the function of the parts object 103 ("CF_item Dic( )"). The example of FIG. 7 shows, in a simplified manner, a state in which the type ("common dictionary") of the dictionary table 122 to be invoked, the type ("input field") of an input/output control to be displayed, an ID attribute value ("A01") of HTML, etc. are specified and invoked as part of parameters. The ID attribute value ("A01") of HTML is dynamically converted to a column name ("customer_ name") according to the mapping information.

The parts object 103 invoked by such a code retains, as data, at least a logical element of a label serving as a display name (text of a label control) and the information about a logical element about the contents of an input/output control to be displayed. Furthermore, as shown in FIG. 7, the information about a logical element of a comment making up a text, etc. explaining contents may be retained. In the example of FIG. 7, among above described three logical elements of the parts object 103, about a control, "input field" is specified as a parameter in the source code 101 and is therefore set.

The invoked parts object 103 further accesses the target dictionary table 122 ("common dictionary") via the dictionary processing unit 121 by, for example, a predetermined function and a method, and acquires dictionary data (in the present embodiment, a set of a plurality of values of "customer name", 40 characters, 20 characters, etc.) corresponding to the column name ("customer_name").

In the example of FIG. 7, information such as a name (a text to be displayed in a label control), the length in the case of an input field (the number of characters in the case of half-width characters), the maximum length in the case of an input field (the number of characters), the type of a validity check of input data, the initial mode of IME, an explanatory comment, a text (display name) in the case of a list display in a table, a display width (pixel value) in the case of a list display in the table, etc. is retained in this order from the upper side as the dictionary data of the dictionary table 122. An output format of acquiring the dictionary data may be, for example, a series of character strings delimiting these values by commas, etc. or may be easily accessible data such as an associative array.

As well as FIG. 3 of the first embodiment, the dictionary tables 122 have a hierarchical structure making up the plurality of dictionary tables 122 having different applicable ranges, and these are configured to be appropriately subjected to selection and use. For example, the dictionary tables 122 of a plurality of types having different applicable ranges such as: dictionaries which are common in a whole system or application working on the Web server system 100 ("common dictionaries"); dictionaries which are common only in specified Web sites ("site dictionaries"); dictionaries which are common only in subsystems ("library dictionaries"); and dictionaries in screen units ("controller dictionaries") are provided.

This case may be configured so that, for example, if corresponding dictionary data cannot be obtained by referencing a dictionary having a narrow applicable range such as the "controller dictionary", the dictionary tables 122 in the higher level (having larger applicable ranges) can be reversely referenced in the order of the "library dictionary-"→the "site dictionary"→the "common dictionary". Alternatively, since the dictionary data cannot be obtained, default values may be used, or an error may be returned.

As well as the first embodiment, the parts object 103 extracts necessary data from the acquired dictionary data, and sets that as the parameters for displaying and controlling a control(s). For example, as the attribute values of a case in which an input field is to be displayed as an input/output control, the length of the field acquired from the dictionary data is set, and the type of a validity check, the value of the initial mode, etc. of IME, the contents of an explanatory comment, etc. are set. The processing about the validity check of input data and controlling of the input/output control such as mode setting of IME is the functions of the input checking unit 112 and the display unit 142; however, as specific implementation, for example, the functions are defined as methods in a class of an inheritance source of the parts object 103 (that is, the parts object 103 has the functions), or the functions are implemented as the functions which can be invoked by the parts object 103.

By virtue of this, as shown in the example of a screen 201 in a lower level of FIG. 7, when executed, the parts object 103 can generate the HTML data 102 so as to display the control of the input field for specifying "customer name". In this process, as described later, for example, the information of the explanatory text of the parts object 103 can be used as help information, etc. about the input/output item.

If only the control of the input field is displayed when the input field is displayed, what to be input is unknown. Therefore, in the present embodiment, as shown in FIG. 7, a text control displaying the display name ("customer name") of the input/output item corresponding to the parts object 103 is displayed as a label (label control) adjacent to the input field. The text sets the information of the label of the retained data of the parts object 103, in other words, the value of the name ("customer name") of the dictionary data acquired from the dictionary table 122 by the parts object 103.

The processing about generation of the HTML data 102 like this is the function of the display unit 142, etc.; however, as specific implementation, for example, the function is defined as a method in a class of an inheritance source of the parts object 103 (that is, the parts object 103 has the functions), or the function is implemented as the function which can be invoked by the parts object 103. Note that, herein, as described above, the three elements, i.e., the label control, the input/output control, and the comment control for displaying an explanatory comment to be displayed are used as one unit to adjust the attribute values, etc. about layout, appearance, etc. collectively in a form with consistency.

FIG. 8 is a drawing explaining an outline of an implementation example of layout adjustment on the source code 101 of the parts object 103. FIG. 8 (*a*) shows a layout example of a control displayed by the parts object 103 on the screen 201 displayed at the client terminal 200. In this case, the parts object 103 includes a text control, which displays the text of "postal code" as a label control; an input field for inputting a "postal code"; and a comment control (text control), which displays the text of "(example) 100-0000" as an explanatory comment. In the shown case of layout, these are arranged at the widths of 120 pixels, 200 pixels, and 150 pixels, respectively.

FIG. 8 (*b*) shows a description example of the source code 101 of a case in which a layout of the controls like the example of FIG. 8 (*a*) is implemented by, for example, a conventional technique such as JSF (JavaServer Faces). Herein, it is shown that codes for displaying the controls have to be described individually by specifying the numbers of pixels of the widths respectively for the three elements (controls).

On the other hand, FIG. 8 (*c*) shows a description example of the source code 101 in the present embodiment by, for example, PHP (Hypertext Preprocessor). Herein, first, with respect to an object ("ViewObject") for carrying out screen display, the numbers of the pixels (120, 200, 150) of the widths of the controls to be displayed are collectively specified, and a disposing pattern ('fmt:pc') of the three elements as described later is also specified in combination. In this manner, the layout information about the parts object 103 can be independently ordered.

Furthermore, in a next row, a code for displaying the parts object 103 is described. Herein, it is specified to acquire the dictionary data corresponding to the column name ('post-al_cd') from "library dictionary ('_bi') in the dictionary table 122 and collectively display the parts object 103 (label control, input field ('txt'), explanatory comment) by an object ("ViewObject") for carrying out screen display based on the information of appearance such as attributes and texts specified in the dictionary data and based on the previously acquired layout information. In the example of FIG. 8 (*c*), the adjustment information, etc. of the layout is not required to be specified every time individually for each of the controls like FIG. 8 (*b*), and the description volume (load on developers) of the codes about layout adjustment can be greatly reduced.

FIG. 9 is a drawing showing an outline of a disposing pattern and a display example of the three elements of the parts object 103. Herein, as shown in FIGS. 8 (*a*) and (*c*), it is shown that, for example, if a basic layout ('fmt:pc') of a case in which the client terminal 200 is a PC, a smartphone, or the like is employed, three regions, i.e., a label part which displays a label control, a control part which displays an input/output control such as an input field, and a comment part which displays a comment control are arranged and disposed sequentially from the left as display regions of the controls.

In this case, on the screen 201, a plurality of input/output items having the same layout can be automatically disposed by a similar positional relation. The input/output items of "postal code", "address 1", "address 2", and "main phone number" are aligned and displayed to have the same values of display widths also in each part of the label part, control part, and the comment part. In this case, if layout information such as the widths of the display regions is once set as shown in the example of the first row of FIG. 8 (*c*) before the parts object 103 is displayed, the load in development can be further reduced since it is controlled so that they are continuously disposed by the same layout information until it is changed.

The input/output control displayed in the control part is not limited to an input field, but may be, for example, a control such as a radio button as shown in the input/output item of "unique key" in the drawing or a drop-down list.

FIG. 10 is a drawing showing outlines of other examples of the disposing patterns of the three elements of the parts object 103. FIGS. 10 (*a*) and (*b*) show layout examples of a case in which the client terminal 200 is a small-screen terminal such as a portable phone. In FIG. 10 (a), the label part is disposed in the right side of the control part, and the comment part is disposed so as to be displayed therebelow in accordance with needs. Similarly, in FIG. 10 (b), the label part and the control part are disposed in the upper/lower sides, and the comment part is disposed so as to be displayed therebelow in accordance with needs. These patterns efficiently utilize narrow screens by not displaying an explanatory comment if the comment is not present (not necessary).

FIGS. 10 (c) and (d) show layout examples of a case in which the client terminal 200 is a smartphone or the like. In FIG. 10 (c), the comment part is disposed in an upper part, and the label part and the control part are arranged and disposed therebelow. In FIG. 10 (d), the label part and the control part are arranged and disposed, the comment part is further disposed by, for example, an icon, and the comment part is displayed by, for example, a pop-up window instead of a text control when the icon is selected, thereby efficiently utilizing the screen which is smaller than that of a PC, etc.

In this manner, in the present embodiment, it is described in the source code 101 that the input/output items are displayed by using the parts object 103; as a result, the HTML data 102 can be generated so that the layout is uniformly adjusted to display the plurality of input/output items (parts object 103). Therefore, the CRUD-type application in the present embodiment can be realized by creating the source code 101 so that the parts object 103 is disposed on the screen in accordance with predetermined rules as the input/output items corresponding to the columns of the business DB 131 and is combined with implementation of standard functions and operations. Moreover, as well as the first embodiment, it is also possible to implement a function to automatically generate the source code 101 like this as, for example, a development supporting system of application programs.

For example, as an application which carries out registration (C: Create) of entries to the business DB 131, the source code 101 is created so that the parts objects 103 for displaying, on the screen, input fields for specifying data to be registered with respect to the columns of the business DB 131 are disposed in accordance with the arranged order of the columns of the business DB 131. Herein, in accordance with needs, the correspondence relations between the IDs of the controls displayed by the screen and the names of the columns are retained as mapping information. Furthermore, as the standard functions, a "register" button, a "cancel" button, etc. for executing registration of the entries to the business DB 131 are disposed. Furthermore, information such as the attribute values and controlling information used when the controls are displayed for the parts objects 103 is retained as dictionary data in the dictionary table(s) 122. Herein, if the items are not particularly specified, they are set by default values.

Moreover, for example, as an application which carries out search (R: Read) with respect to the business DB 131, as well as the above description, the source code 101 is created so as to dispose the parts objects 103 for displaying, on the screen, input fields for specifying the conditions for searching the business DB 131. Herein, it is excessive to specify all the columns of the target tables of the business DB 131 as search conditions; therefore, for example, simplification such as tentatively displaying the input fields only for the top five columns is carried out, and they can be changed later. Moreover, in accordance with needs, the correspondence relations between the IDs of the controls displayed by the screen and the names of the columns are retained as mapping information. Furthermore, a "search" button, etc. for carrying out search of the entries of the business DB 131 are disposed as the standard function.

Moreover, for example, a table (chart) control for displaying a search result(s) is automatically disposed in a lower part of a region in which the search conditions are input. Herein, for example, the contents corresponding to invoking of the parts objects 103 corresponding to the columns of the business DB 131 are set in an item definition array of the table control object. For example, a title row of a table serves as a display region of the label part common to the parts objects 103, and rows of the table serve as display regions of the control parts of the parts objects 103. As a result, the display unit 142 or the parts objects 103 can be implemented so that the contents of the columns of the business DB 131 are displayed in respective rows of the table control.

As explained above, according to the Web server system 100, which is the second embodiment of the present invention, for example, in the CRUD-type Web application program which accesses the business database, the input/output items, etc. displayed on the screen are displayed by the parts object 103 making up the screen controls corresponding to the plurality of logical element units, and the layout information is configured to be independent; as a result, the layout, attributes, etc. thereof can be uniformly adjusted in the unit of the parts object 103 in the whole screen.

As a result, for example, with respect to a displayable region, the display widths of a label control and an input/output control can be integrally adjusted so as to prevent the label control, for example, from being subjected to a line break at an unintended part or adversely from not being subjected to a line break at an intended part; and the display positions, widths, etc. of an input/output control having different appearance depending on a device, OS, etc. such as a radio button can be adjusted integrally with a label control depending on a plurality of devices, OS, etc. Moreover, a plurality of input/output items can be subjected to uniform adjustment of the layout of the controls and can be disposed in a form with consistency.

Moreover, since the parts objects 103 and the input/output items correspond to each other one-on-one, it becomes easy to externally retain parameters, attribute values, etc. for the controls as dictionary data, etc. collectively and to manage them in association with the input/output items. Moreover, the information about layout adjustment among the plurality of screen controls serving as the elements can be defined to be independent from the parts objects 103, and the load required in the layout adjustment among the controls can be greatly reduced.

Moreover, for example, the present embodiment employs a standard CRUD-type Web application as a target, but is not limited thereto. With respect to unique applications (not limited to Web applications, but may be client/server types, stand-alone types, etc.) which are built by a user(s), for example, to include operation contents such as user interfaces and business logic by the form of combination of the dictionary tables 122 and the parts objects 103, the layout of the parts objects 103 can be adjusted according to similar ideas.

[Third Embodiment]

A Web server system, which is a third embodiment of the present invention, can easily generate a demo application which can alone reproduce, for example, screen transitions of a so-called CRUD-type Web application program, which is operated on a Web server and accesses a business database, in a stand-alone environment such as a Web browser of the client terminal.

In the present embodiment, as well as the first and second embodiments, for example, in a CRUD-type Web application program, in order to display contents about input/output items on a screen (for example, input items for specifying the contents of search conditions for acquiring data from the business database, output items displaying the contents of search results), instead of directly using standard control objects (hereinafter, simply described as "controls" in some cases), parts objects in which data of display names, set contents and controlling processing of the controls, and explanatory texts is integrated as described later are used.

As well as the first and second embodiments, the parts object can specify, as parameters, what kind of controls (for example, only text control, (text control and) an input field, (text control and) a drop-down list, etc.) are to be displayed on a screen. Moreover, attribute values of the controls (for example, the contents of the text displayed in a text control, the length of an input field, etc.), controlling information (for example, the manner of carrying out a validity check of input data, etc.), etc. can be also specified, and the parts object is implemented so that the controls are displayed and controlled in accordance with the specified contents.

In other words, the parts object is configured to display, in combination, an input/output control, which handles data of an input/output item such as an input field, a drop-down list, and a text, and a label control, which is a text control displaying a name, etc. of the input/output item, and the parts object has a configuration that the pattern of outputting these controls can be specified.

In this process, as shown in the second embodiment, the label control and the input/output control can be collectively subjected to adjustment of the attribute values such as the width of the control in the form with consistency. Therefore, a cumbersome process of individually specifying attribute values, etc. by a user so that they have consistency is not required, and the appearance of the displayed controls can be adjusted. This adjustment includes, for example, integrally adjusting the display widths of the label control and the input/output control so as to prevent, for example, the label control from being subjected to a line break at an unintended part or reversely from being not subjected to a line break at an intended part with respect to a displayable region.

In the present embodiment, source code is created on the assumption that the Web application program displays the contents about the input/output items on a screen by using the parts objects. More specifically, the controls are displayed indirectly by using the parts objects (parts objects dynamically generate HTML data, scripts, etc. for displaying target controls when executed on the Web server system). Moreover, the information about mapping between columns of a database serving as a target of access and the input/output items on the screen is retained on the source code as mapping information of identification information of the columns of the database (for example, column names) and identification information (for example, ID attribute values of HTML) of the corresponding parts objects.

Furthermore, in the present embodiment, as well as the first and second embodiments, as described later, of the parts objects, the information, etc. about the text to be displayed in label controls and the attribute values and controlling processing of input/output controls of the parts objects is configured to be externally retained, except part thereof, as dictionary data associated with identification information such as IDs of the parts objects or corresponding column names of the database instead of directly specifying that on the source code. As a result, the appearance, attribute, etc. of the controls displayed on the screen by the display method of the screen and the parts objects can be dynamically changed without changing the once-generated source code.

Moreover, a function commonly owned by the parts objects such as access to the above described dictionary data is implemented in a class of an inheritance source, and the class is inherited upon development to create parts objects so that a Web application program can be developed without implementing the function of the parts objects every time by a developer.

Herein, when a user actually carries out an operation and makes a screen transition of the Web application program, at the timing when screens are generated and output by the Web server program, the Web server system of the present embodiment automatically generates local data, in which paths, etc. have been converted so as to be operable in a local of the client terminal, based on HTML data of the screens accumulated in an output buffer of the Web server program. The local data is transmitted to and stored in predetermined folders and directories of the client terminal (having the same hierarchical configuration as that on the Web server) together with necessary resources.

By virtue of such a method, a demo application which supports the screen transition of the executed Web application and operates alone on the client terminal can be automatically generated. As described above, conventionally, generation of a demo application by such a method has been manually carried out for each screen mainly by a user. On the other hand, in the present embodiment, a process of generating such a demo application can be automatically carried out, and load on the user can be significantly reduced.

In the present embodiment, it is assumed that the Web application program is developed by using the above described parts objects. However, in the present embodiment, as described above, the demo application is generated based on the HTML data of the screen accumulated in the output buffer; therefore, as long as the process of acquiring the HTML data from the output buffer can be implemented, the Web application program is not particularly limited to that using the above described parts objects, and any Web application program can be employed as a target.

<System Configuration>

FIG. 11 is a drawing showing an outline of a configuration example of a Web server system, which is the third embodiment of the present invention. A Web server system 100 basically has a configuration approximately similar to the configuration shown in the example of FIG. 6 of the second embodiment and includes computer equipment such as server equipment or a virtual server in a cloud-computing environment. In addition to an OS and middleware such as a DBMS and a Web server program, which are not shown, the Web server system has units such as a request processing unit 110 implemented by source code 101 created by a user or a software program such as a library or object invoked therefrom, a dictionary processing unit 121, business logic 130, and a response processing unit 140.

With respect to a request from a program such as an unshown Web browser in a client terminal 200 connected via a network 300 such as the Internet, the Web server system 100 accesses a business database (DB) 131 and carries out processing by the business logic 130, and makes a response by outputting HTML data 102 to the client terminal 200, thereby providing a service.

The configurations, functions, and processing contents of the units of the request processing unit 110, the dictionary processing unit 121, and the business logic 130 are similar to those explained in the second embodiment. Therefore, redundant explanations are omitted.

The response processing unit 140 has a function to generate the HTML data 102 based on the processing results of the business logic 130, etc. based on the contents of the source code 101 and respond to the client terminal 200, and has units such as the display unit 142, the display adjusting unit 143, and a local-data generating unit 144 implemented by a software program(s). The functions and processing contents of the units of the display unit 142 and the display adjusting unit 143 are similar to those explained in the second embodiment. Therefore, redundant explanations are omitted.

The local-data generating unit 144 has a function to generate a demo application in the client terminal 200 by generating local data 105 based on the HTML data 102 generated by the display unit 142 and transmitting the local data 105 to a predetermined folder or directory of the client terminal 200 and storing the local data 105 therein together with a necessary resource 104.

Specifically, for example, first, the HTML data 102 accumulated in the output buffer of the unshown Web server program is acquired when the HTML data 102 is output to the client terminal 200. Specifically, this timing is, for example, "immediately before" output, and, in the present embodiment, the controls displayed on the screens are displayed by using the parts objects 103; therefore, for example, a predetermined method, etc. may be invoked when a last HTML tag ("</html>") is written in a common class, etc. for displaying the parts objects 103 (generating HTML) and generating screens.

Even in a case which is different from the present embodiment and is not using the parts objects 103 for screen display, for example, a similar process may be carried out by adding one row of the code that invokes the predetermined method, etc. to the end commonly in the screens. Moreover, a means capable of catching an event of completion of screen generation, which is for example executed when a debug code of a trace point, log output, etc. upon termination is invoked, can be appropriately utilized.

The local-data generating unit 144 generates the local data 105 by further subjecting the HTML data 102, which has been acquired from the output buffer upon completion of screen generation, to path conversion, etc. as described later so that the HTML data 102 becomes operable in the stand-alone environment of the client terminal 200. Path conversion, etc. are similarly carried out also for the necessary resource 104 such as image data and other script files referenced by the HTML data 102. The generated local data 105 and the necessary resource 104 are transmitted to and stored in the predetermined folder or directory of the client terminal 200.

In the client terminal 200, the screen contents or screen transitions of the Web application can be reproduced in the stand-alone environment without requiring the Web server by accessing the demo application making up the local data 105 and the necessary resource 104 stored in the local predetermined folder or directory by utilizing, for example, a Web browser.

In the present embodiment, by a process similar to the process shown in the example of FIG. 7 of the second embodiment, the input/output items of the corresponding columns are displayed on the screen by the parts object 103 in the CRUD-type application. In this process, immediately before the HTML data 102, which is generated by the display unit 142, the display adjusting unit 143, etc. of the response processing unit 140 by the above described process and is accumulated in the output buffer of the unshown Web server program, is output to the client terminal 200, the local-data generating unit 144 acquires the HTML data 102 and generates the local data 105.

In the present embodiment, as described above, in the common class, etc. for displaying the parts object 103 (generating HTML) and generating the screen, the predetermined method, etc. are invoked when the last HTML tag ("</html>") is written, thereby executing this.

<Local-Data Generating Process>

FIG. 12 is a flow chart showing an outline of an example of the flow of a process of generating the local data 105 from the HTML data 102. As described above, the local-data generating unit 144 is invoked at the timing (when screen generation making up the HTML data 102 is completed) immediately before the HTML data 102 of each screen of the screen transition is generated and output to the client terminal 200. When invoked, first, the local-data generating unit 144 retrieves the HTML data 102 accumulated in the output buffer of the unshown Web server program and subjects HTML tags described therein to editing so that they have the shapes of steps by setting a tab or indent for each hierarchy in order to facilitate viewing in accordance with needs (S01).

Then, the HTML data 102 is subjected to conversion of the paths of the described file or resource 104 (S02). Specifically, for example, internal paths making up "href="/"", "href='/'", "src="/"", "src='/'", "url('/'", "url("/"", and other URL expressions are converted to local paths subsequent to "file:///".

Herein, in the local path conversion, if a path expression is an absolute path starting from "/", a local path is obtained by adding a character string of the predetermined directory or folder (for example, "c:¥ design". Hereinafter, described as "output destination directory") serving as a reference of a save destination in the client terminal 200, to the head thereof. On the other hand, if the path expression is a relative path starting from "..../", the absolute path of the location, which is resulted from tracing back the disposition location in the Web server system 100 by the number of "..../" in the route direction, is acquired; and, then, the character string of the output destination directory is added to the head thereof to obtain a local path. The format of the character string of the local path is appropriately converted depending on a platform of the client terminal 200. Herein, if URL ends with "/", "index.html" is used as a file name, and the file name of a parameter part is also converted to an appropriate file name corresponding to the platform in synchronization with the file name of the process of copying to the client terminal 200 in a later-described process. Note that, the value of the output destination directory can be set/registered, for example, as dictionary data in the dictionary table 122.

Then, also for the disposition location of the HTML data 102 per se, the path of the disposition location is acquired by carrying out local-path conversion, and the converted HTML data 102 is output as a file to the disposition location in the client terminal 200 (S03). If a folder or directory is not present at the disposition location, a folder or directory is newly created, and the data is output thereto.

Furthermore, the files corresponding to the paths converted to "file:///...." in the HTML data 102 in step S02 are extracted from the resource 104 (S04), the paths making up URL expressions described therein for the extracted files are converted to local paths (S05), and the converted files, resource 104, etc. are output or copied to predetermined disposition locations in the client terminal 200 (S06).

For example, if the extracted file is a CSS (Cascading Style Sheets) file, an image file in "url( . . . )" therein is subjected to above described local-path conversion, and the image file is copied from the resource 104 to the location of the path in the client terminal 200. Local-path conversion is carried out also for the disposition location of the CSS file per se to acquire the path of the disposition location, and the CSS file after the conversion is output to the disposition location in the client terminal 200.

If a compression file is used in the CSS file, the file before the compression is disposed in the server in advance after it becomes possible to specify that the file is a file before compression by, for example, naming rules, and processing is carried out by using these. Similarly, conversion rules, etc. with a disposition location in the server are determined also for an external file, and the file is disposed in the server in advance after it becomes possible to specify that the file is an external file.

If the extracted file is a JS file (JavaScript (registered trade name) external file), an image file in the JS file is extracted and subjected to local-path conversion, and the image file is copied from the resource 104 to the location of the path in the client terminal 200. Moreover, internal paths making up URL expressions in the JS file are converted to local paths. Furthermore, the disposition location of the JS file per se is also subjected to local-path conversion to acquire the path of the disposition location, and the JS file after the conversion is output to the disposition location in the client terminal 200.

If the extracted file is an image file, for the path of the image file which has already undergone local-path conversion in the HTML data 102 after the conversion, the image file is copied from the resource 104 to the corresponding location in the client terminal 200.

By virtue of the above described series of processes, when the user executes the Web application and makes a screen transition, the demo application capable of displaying alone each screen in the client terminal 200 can be automatically generated and output to the client terminal 200.

For example, the setting information whether the function of generating the demo application is to be enabled or not is retained in the Web server system 100, and, if the function is disabled, it is possible not to generate the demo application even when the Web application is executed to make a screen transition. Also, the Web server system 100 may be built to be coupled with a development environment, etc. of the Web application program, and the demo application may be generated along with operations such as checking and simulations of developed screens.

As explained above, according to the Web server system 100, which is the third embodiment of the present invention, when the user once executes the Web application to make a screen transition via the client terminal 200, the necessary HTML files and resource files of the screens included in the screen transition can be automatically disposed to have the same URL structure as that of the Web server system 100 (Web server) below the predetermined output destination directory in the client terminal 200, and the demo application which operates alone in the client terminal 200 can be automatically generated. As a result, the creation load of the demo application can be significantly reduced.

Moreover, for example, other than generation of the demo application as described above, for example, the data generated by the mechanism of the present embodiment can be applied to a system of compressing and local files making up HTML files, JS files, and CSS files by, for example, a ZIP format and distributing such local files.

In the foregoing, the invention made by the inventors of the present invention has been concretely described based on the embodiments. However, it is needless to say that the present invention is not limited to the foregoing embodiments and various modifications and alterations can be made within the scope of the present invention. For example, the above embodiments are those described in detail in order to better illustrate the invention and are not intended to be limited to necessarily provide all the configurations described. Part of the configuration of a certain embodiment can be replaced by the configuration of another embodiment, and the configuration of the other embodiment can be added to the configuration of the certain embodiment. Moreover, part of the configuration of the embodiment can be subjected to addition/deletion/replacement of other configurations.

The present invention can be utilized for development techniques of applications in a Web server system.

Although various embodiments of the present invention have been described and shown, the invention is not restricted thereto, but may also be embodied in other ways within the scope of the subject-matter defined in the following claims.

What is claimed is:

1. A dictionary system for providing dictionary data to a Web server system that includes a memory storing an application program and a processor executing the application program for providing a service to a client terminal connected to the Web server system by responding a processing result to the client terminal in response to a request from the client terminal, and displaying a screen making up a screen control when the processing result is displayed on a screen of the client terminal;

wherein the Web server system adjusts, for input/output items displayed on the screen of the client terminal, a layout of the screen controls corresponding to each of the input/output items and displays it on the screen of the client terminal by a parts object, the parts objects having at least information about a label control for displaying a text representing a name of the input/output items and information about an input/output control for displaying an input/output of the input/output items;

the Web server system can specify layout information by a source code of the application program independently of display of the parts object, the layout information being about adjustment contents of the layout that includes a disposing pattern of the plurality of screen controls displayed by the parts objects and/or respective display widths of the screen controls;

the dictionary system comprises:
a plurality of types of dictionary tables having a hierarchical structure, the dictionary table having a large applicable range serving as a higher level regarding a range to which the dictionary data is applied; and
a dictionary processing unit for acquiring the dictionary data corresponding to a specified key from the specified dictionary table;

the dictionary data retained by the dictionary table includes converting a data item including an attribute value of the input/output controls, the data item relating to the parts object displayed on the screen of the client terminal; and the dictionary processing unit receives specification about which hierarchy of the hierarchical structure in the dictionary tables is to be referenced when the dictionary data is to be acquired from the dictionary table, and sequentially inquires the dictionary table of a further higher level whether the dictionary table has the dictionary data corresponding to the key or not if the dictionary data corresponding to the specified key is not present in the dictionary table of the specified hierarchy.

2. The dictionary system according to claim 1, wherein information about permission/non-permission of reference to the dictionary table of each hierarchy in the hierarchical structure and/or, if the dictionary data corresponding to the specified key is not present in the dictionary table of a referenced hierarchy, information about permission/non-permission of reference to the dictionary table of a further higher level can be set.

3. The dictionary system according to claim 1, wherein a first hierarchy serving as a highest level of the hierarchical structure includes one or more of the dictionary tables unique to respective language environments.

4. The dictionary system according to claim 3, wherein a second hierarchy serving as a layer lower than the first hierarchy of the hierarchical structure includes one or more of the dictionary tables unique to respective Web sites provided by utilizing the Web server system.

5. The dictionary system according to claim 4, wherein a third hierarchy serving as a layer lower than the second hierarchy of the hierarchical structure includes one or more of the dictionary tables unique to respective libraries utilized by the Web sites.

6. The dictionary system according to claim 5, wherein a fourth hierarchy serving as a layer lower than the third hierarchy of the hierarchical structure includes one or more of the dictionary tables unique to respective screens provided by the Web sites.

7. A dictionary system for providing dictionary data to a Web server system, the Web server system including a memory storing an application program and a processor executing the application program for providing a service to a client terminal connected to the Web server system by invoking a corresponding business logic in response to a request from the client terminal and by responding a processing result of the business logic to the client terminal, and displaying a screen making up a plurality of screen controls when the processing result is displayed on a screen of the client terminal;

wherein the Web server system adjusts and displays, for each of one or more input/output items of the application program, a layout of the plurality of screen controls corresponding to the input/output items by a parts object, the input/output items being displayed on the screen of the client terminal, and the parts object having at least information about a label control for displaying a text representing a name of the input/output items and information about an input/output control for displaying the input/output items;

the Web server system can specify layout information by a source code of the application program independently of display of the parts object, the layout information being common to one or more of the parts objects and being about adjustment contents of the layout that includes a disposing pattern of the plurality of screen controls displayed by the parts objects and/or respective display widths of the screen controls;

the dictionary system comprises:
a plurality of types of dictionary tables having a hierarchical structure, the dictionary table having a large applicable range serves as a higher level regarding a range to which the dictionary data is applied; and
a dictionary processing unit for acquiring the dictionary data corresponding to a specified key from the specified dictionary table;

the dictionary data retained by the dictionary table includes converting the text of the label control, and converting a data item including an attribute value of the input/output controls, the text and the data item relating to the parts object displayed on the screen of the client terminal; and the dictionary processing unit receives specification about which hierarchy of the hierarchical structure in the dictionary tables is to be referenced when the dictionary data is to be acquired from the dictionary table, and sequentially inquires the dictionary table of a further higher level whether the dictionary table has the dictionary data corresponding to the key or not if the dictionary data corresponding to the specified key is not present in the dictionary table of the specified hierarchy.

8. A Web server system including a memory storing an application program and a processor executing the application program for providing a service to a client terminal connected to the Web server system by invoking a corresponding business logic in response to a request from the client terminal and by responding a processing result of the business logic to the client terminal, and displaying a screen making up a plurality of screen controls when the processing result is displayed on a screen of the client terminal;

wherein, for each input/output items of the application program displayed on the screen of the client terminal, a layout of the screen control corresponding to the input/output items is adjusted and displayed on the screen of the client terminal by a parts object having at least information about a label control for displaying a text representing a name of the input/output items and information about an input/output control for displaying an input/output of the input/output item; and layout information about an adjustment content of the layout including a display width of the screen control is applied to the plurality of parts object about the screen control.

9. The Web server system according to claim 8, wherein the parts object further has information about a comment control for displaying a comment showing an explanation of the corresponding input/output item.

10. The Web server system according to claim 9, wherein the parts object displays an icon image for receiving specification for displaying a pop-up window for displaying the comment as the comment control.

11. The Web server system according to claim 8, comprising
a dictionary table in which information including one or more attribute values of the plurality of screen controls displayed by the parts object is stored as dictionary data associated with identification information of the input/output item corresponding to the parts object, the identification information serving as a key;

wherein, for the parts object included in the processing result, part or all of the attribute values about the corresponding parts object is/are acquired from the dictionary table while using the identification information of the corresponding input/output item as the key; and the parts object displays the plurality of corresponding screen controls on the screen of the client terminal based on the acquired attribute values.

12. A Web server system including a memory storing an application program and a processor executing the application program for providing a service to a client terminal connected to the Web server system by invoking a corresponding business logic in response to a request from the client terminal and by responding a processing result of the business logic to the client terminal, and displaying a screen making up a plurality of screen controls when the processing result is displayed on a screen of the client terminal;

for each of one or more input/output items of the application program displayed on the screen of the client terminal, a layout of the plurality of screen controls corresponding to the input/output items is adjusted and displayed by a parts object having at least information about a label control for displaying a text representing a name of the input/output item and information about an input/output control for displaying the input/output items in order to carry out input or output; and the Web server system can specify layout information by a source code of the application program independently of display of the parts object, the layout information being common to one or more of the parts objects and being about adjustment contents of the layout that includes a disposing pattern of the plurality of screen controls displayed by the parts objects and/or respective display widths of the screen controls.

13. A Web server system that operates, by invoking a corresponding business logic in response to a request from a client terminal and by responding a processing result of the business logic to the client terminal and displaying the processing result on a screen, the Web server system including a memory storing a Web application program and a processor executing the Web application program for providing a service to the client terminal connected to the Web server system, and generating a demo application capable of reproducing a predetermined screen transition of the Web application program alone in the client terminal;

wherein, when the Web application program generates and outputs a screen to be responded to the client terminal, for each of one or more input/output items of the application program displayed on the screen of the client terminal, a layout of the plurality of screen controls corresponding to the input/output items is adjusted and displayed on the screen of the client terminal by a parts object having at least information about a label control for displaying a text representing a name of the input/output items and information about an input/output control for displaying an input/output of the input/output items;

the Web server system can specify layout information by a source code of the application program independently of display of the parts object, the layout information being common to one or more of the parts objects and being about adjustment contents of the layout that includes a disposing pattern of the plurality of screen controls displayed by the parts object and/or respective display widths of the screen controls;

HTML data is acquired from an output buffer retaining the HTML data of the generated screen, a URL expression or a path included in the HTML data is converted to a first local path using a predetermined directory in the client terminal as a reference, and a path of an existing location of the HTML data is converted to a second local path using the predetermined directory as a reference; and as the demo application, an HTML file making up the HTML data is output to a location represented by the second local path in the client terminal, and each file including a resource referenced by the HTML data is outputted or copied to a location represented by the corresponding first local path in the client terminal.

14. The Web server system according to claim 13, wherein, regarding each file including the resource referenced by the HTML data, a URL expression or a path included in the file is converted to a third local path using the predetermined directory as a reference.

15. The Web server system according to claim 14, wherein a hierarchical configuration below the predetermined directory making up the first and second local paths corresponds to a hierarchical configuration of a directory in which a file and resource about the Web application program are disposed.

16. A demo-application generating method in a Web server system that operates, by invoking a corresponding business logic in response to a request from a client terminal and by responding a processing result of the business logic to the client terminal and displaying the processing result on a screen, the Web server system including a memory storing a Web application program and a processor executing the Web application program for providing a service to the client terminal connected to the Web server system, and generating a demo application capable of reproducing a predetermined screen transition of the Web application program alone in the client terminal, the demo-application generating method comprising:

a first step of, when the Web application program generates and outputs a screen to be responded to the client terminal, adjusts and displays, for each of one or more input/output items of the application program, a layout of the plurality of screen controls corresponding to the input/output items by a parts object, the input/output items being displayed on the screen of the client terminal, and the parts object having at least information about a label control for displaying a text representing a name of the input/output items and information about an input/output control for displaying the input/output items;

a second step of acquiring HTML data from an output buffer retaining the HTML data of the generated screen, converting a URL expression or a path included in the HTML data to a first local path using a predetermined directory in the client terminal as a reference, and converting a path of an existing location of the HTML data to a second local path using the predetermined directory as a reference; and a third step of, as the demo application, outputting an HTML file making up the HTML data to a location represented by the second local path in the client terminal, and outputting or copying each file including a resource referenced by the HTML data to a location represented by the corresponding first local path in the client terminal;

wherein the first step adjusts the layout of the plurality of screen controls based on layout information, the layout information being specified by a source code of the application program independently of display of the parts object, the layout information being common to one or more of the parts objects and being about adjustment contents of the layout that includes a disposing pattern of the plurality of screen controls displayed by the parts objects and/or respective display widths of the screen controls.

* * * * *